(12) United States Patent
Eichstedt et al.

(10) Patent No.: US 9,969,317 B2
(45) Date of Patent: May 15, 2018

(54) MULTI-APPLICATION VEHICULAR RETENTION SYSTEM

(71) Applicant: SPARTAN MOTORS, INC., Charlotte, MI (US)

(72) Inventors: Richard Eichstedt, Walkerton, IN (US); Terry Kessler, Warsaw, IN (US); Douglas Sagarsee, Elkhart, IN (US)

(73) Assignee: Spartan Motors, Inc., Charlotte, MI (US)

( * ) Notice: Subject to any disclaimer, the term of this patent is extended or adjusted under 35 U.S.C. 154(b) by 0 days. days.

(21) Appl. No.: 15/377,367

(22) Filed: Dec. 13, 2016

(65) Prior Publication Data

US 2017/0166103 A1    Jun. 15, 2017

Related U.S. Application Data

(60) Provisional application No. 62/267,665, filed on Dec. 15, 2015.

(51) Int. Cl.
*B60P 7/08* (2006.01)
*B60P 1/64* (2006.01)

(52) U.S. Cl.
CPC .............. *B60P 7/08* (2013.01); *B60P 1/6409* (2013.01)

(58) Field of Classification Search
CPC ............ B60P 7/08; B60P 1/6409; B60P 3/007

USPC .... 410/7, 8, 31–33, 66, 67, 69, 80, 89, 104; 414/401, 402, 498; 296/3; 280/79.3
See application file for complete search history.

(56) References Cited

U.S. PATENT DOCUMENTS

| | | | |
|---|---|---|---|
| 4,231,695 A * | 11/1980 | Weston, Sr. | ............... B60P 1/52 410/67 |
| 6,685,404 B2 * | 2/2004 | Udivich | ................. B60P 3/055 410/32 |
| 7,757,615 B2 | 7/2010 | McDonald et al. | |

* cited by examiner

*Primary Examiner* — Stephen Gordon
(74) *Attorney, Agent, or Firm* — Barnes & Thornburg LLP

(57) ABSTRACT

A utility land vehicle is provided having a cargo compartment that includes a retention system. One embodiment of the retention system includes latch and receiver assemblies. The latch assembly includes first and second latches. The first and second latches are spaced apart from each other. A tie attached to each of the first and second latches actuates to cause both first and second latches to release. The receiver assemblies comprise first and second receivers. Each of the first and second receivers includes a body and a slot formed in the body. Each of the slots formed in each body of each of the first and second receivers includes an opening wherein the opening of the slot formed in the body of the first receiver faces the first latch, and the opening of the slot formed in the body of the second receiver faces the second latch.

16 Claims, 22 Drawing Sheets

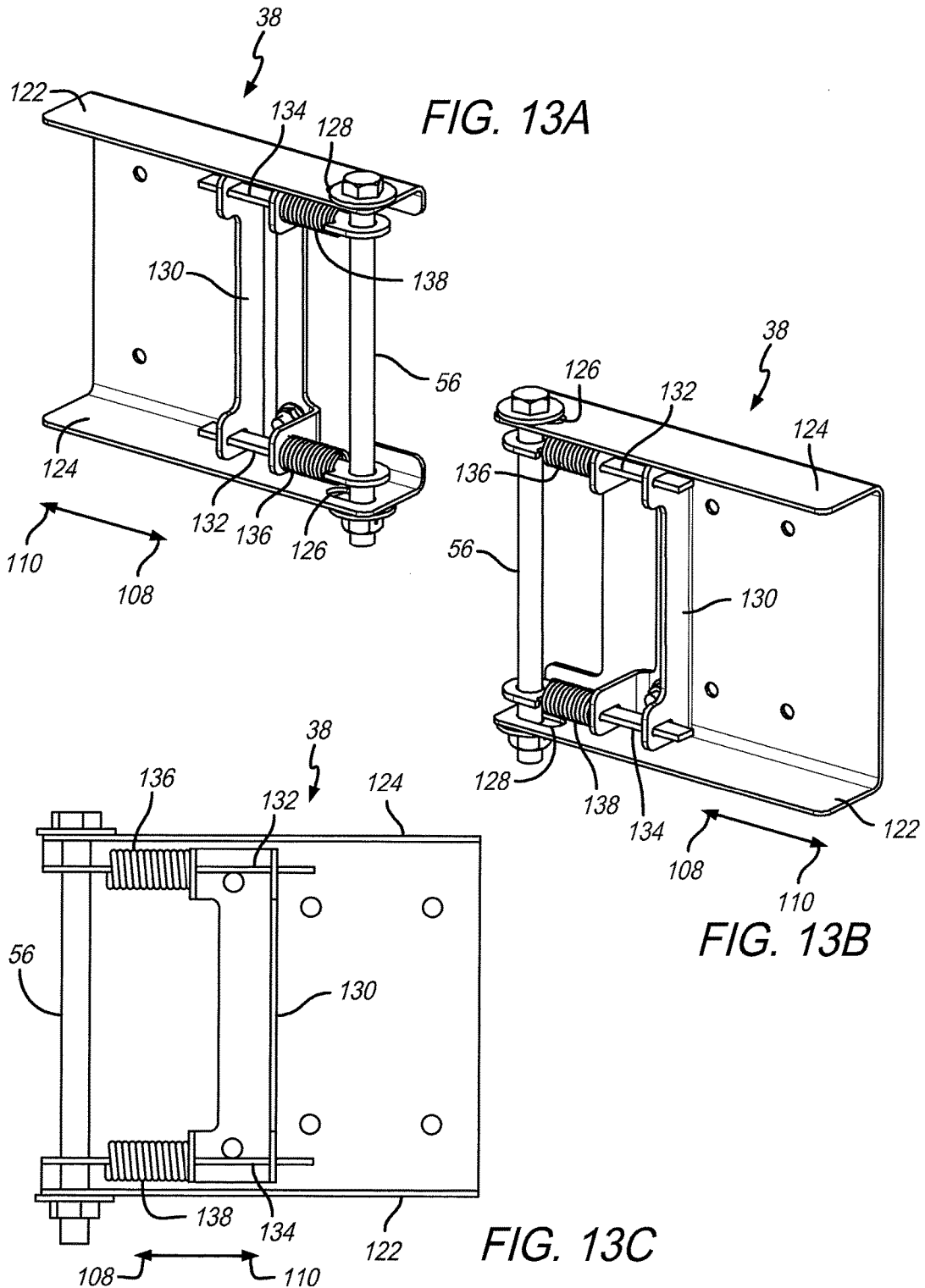

MULTI-APPLICATION VEHICULAR RETENTION SYSTEM

RELATED APPLICATIONS

The present application claims priority to U.S. Provisional Patent Application Ser. No. 62/267,665, filed on Dec. 15, 2015, entitled "Multi-Application Vehicular Retention System" which is hereby incorporated by reference in its entirety.

TECHNICAL FIELD AND SUMMARY

The present disclosure relates to vehicles, and particularly cargo, utility, work, recreation, delivery, or other similar type land vehicles that include a retention system to secure structures to the vehicles' walls.

Vans, trucks, cargo, utility, work, recreation, and delivery vehicles are known. Typically these vehicles include first and second compartments, such as an operator compartment and a cargo compartment, for example. The cargo compartment is sized and configured to hold any myriad of items, including but not limited to, boxes, shelves, bags, carts, tool holders, cabinets, and dollies.

An embodiment of the present disclosure provides a retention system to hold any variety of these times, or like items or structures in such a vehicle. For example, the retention system may include a track and bracket system. In an embodiment, the retention system includes at least one track member that may extend longitudinally and attach illustratively about horizontally on the sidewall of the vehicle, such as in the interior wall of the cargo compartment of the vehicle. Each track includes a plurality of regularly spaced openings to receive attachment structures. In one illustrative embodiment, the track may receive a bracket configured to selectively attach to a shelf. In another embodiment, another bracket may be employed to secure the track to a cabinet or a cart. It is appreciated that the brackets may be selectively movable along the track in order to position the shelf, cabinet, cart, etc., in a desired location based on the operator's needs. Illustratively, a pin may be inserted through both the bracket and one of the regularly spaced openings on the track to secure both structures together. In another embodiment, the pin may have a plurality of tines that engage multiple regularly spaced openings on the track at one time, in order to secure the bracket thereto.

In another embodiment, a plurality of tracks may be used to attach multiple brackets thereto for the purpose of securing a structure. Carts, cabinets, etc., may need additional securement because of their relative size and/or weight making multiple tracks useful. In addition, these brackets may be useful to receive brackets that hold shelving tracks to hold shelves, such as those described in U.S. Pat. No. 7,757,615 (and similar type, or portions of such shelves). The disclosure of this patent is incorporated herein by reference.

An illustrative embodiment of the present disclosure provides a utility land vehicle having a driver compartment and a cargo compartment including a cargo compartment wall. The utility land vehicle cargo compartment comprises: a first longitudinally extending track; a second longitudinally extending track; each of the first and second longitudinally extending tracks include a plurality of track holes each regularly positioned along the longitudinal extent of each of the first and second longitudinally extending tracks; the first and second longitudinally extending tracks are placed on the cargo compartment wall and spaced apart from each other; a latch assembly includes a first latch and a second latch; each of the first and second latches include at least a latch member and a latch trigger; the latch member is movable to selectively hold and release a bar; the latch trigger selectively moves the latch member when the latch trigger is actuated; the first latch is removably attached to the first track and the second latch is removably attached to the second track which causes the first and second latches to be spaced apart from each other; a tie is attached to each latch trigger of the first and second latches, wherein actuation of the tie causes both latch triggers to move the latch member of each of the first and second latches to a release position; a receiver assembly includes first and second receivers; each of the first and second receivers includes a body and a slot formed in the body; the body of the first receiver includes a portion that is removably attached to the first track and the body of the second receiver includes a portion that is removably attached to the second track; each of the slots formed in each body of each of the first and second receivers includes an opening wherein the opening of the slot formed in the body of the first receiver faces the first latch, and the opening of the slot formed in the body of the second receiver faces the second latch; and the bar is configured to enter the slot through the opening of at least one of the first and second receivers.

In the above and other illustrative embodiments, the utility land vehicle cargo compartment may further comprise: at least one bar assembly configured to attach to a storage structure to be located in the cargo compartment of the vehicle, wherein the bar assembly includes the bar configured and sized to fit into one of the first latch, second latch, first receiver, or second receiver; first and second bar assemblies are each configured to attach to a storage structure to be located in the cargo compartment of the utility land vehicle, wherein both the first and second bar assemblies include the bar, wherein the bar of the first bar assembly is configured and sized to fit into, be secured by, and selectively released from the first latch, and the bar of the second bar assembly being configured and sized to fit into the slot of the first receiver through the opening of the first receiver, wherein the latch member of the first latch holds the bar of the first bar assembly until actuation of the tie selectively releases the bar of the first bar assembly from the latch member, and thereafter the bar of the second bar assembly is free to move out of the slot of the first receiver through the opening of the first receiver; third and fourth bar assemblies each configured to attach to a storage structure to be located in the cargo compartment of the utility land vehicle, wherein both the third and fourth bar assemblies include the bar, wherein the bar of the third bar assembly is configured and sized to fit into, be secured by, and selectively released from the second latch, and the bar of the fourth bar assembly is configured and sized to fit into the slot of the second receiver through the opening of the second receiver, wherein the latch member of the second latch holds the bar of the third bar assembly until actuation of the tie selectively releases the bar of the third bar assembly from the latch member, and thereafter the bar of the fourth bar assembly is free to move out of the slot of the second receiver through the opening of the second receiver; a plurality of pins wherein each pin engages each one of the first and second latches and each one of the first and second receivers, wherein each pin is disposed through at least one of the plurality of track holes on the first or the second longitudinally extending tracks; each of the plurality of pins includes first and second spaced apart tines such that each of the tines extend through a first and second corresponding track hole of the plurality of track holes; the tie is composed of a material selected from the group consisting of a flexible material and a rigid material; the tie is selected from the group consisting of a cable and a bar; the first and second longitudinally extending tracks are positioned parallel to each other; the storage structure to be located in the cargo compartment of the utility land vehicle being selected from the group consisting of a cart, container, rack, cabinet, and shelf; and the bar being selected from the group consisting of a rod, arm, appendage, bracket, and hook.

Another illustrative embodiment of the present disclosure provides a utility land vehicle having a driver compartment and a cargo compartment including a cargo compartment wall. The utility land vehicle cargo compartment comprises: a latch assembly includes a first latch and a second latch; each of the first and second latches include at least a latch member and a latch trigger; the latch member is movable to selectively hold and release a storage structure; the latch trigger selectively moves the latch member when the latch trigger is actuated; the first latch and the second latch are spaced apart from each other; a tie attached to each latch trigger of the first and second latches, wherein actuation of the tie causes both latch triggers to move the latch member of each of the first and second latches to a release position; and a receiver assembly comprising first and second receivers; each of the first and second receivers includes a body and a slot formed in the body; each of the slots formed in each body of each of the first and second receivers includes an opening wherein the opening of the slot formed in the body of the first receiver faces the first latch, and the opening of the slot formed in the body of the second receiver faces the second latch; and the storage structure is configured to enter the slot through the opening of at least one of the first and second receivers.

In the above and other illustrative embodiments, the utility land vehicle cargo compartment may further comprise: a first longitudinally extending track, and a second longitudinally extending track, wherein each of the first and second longitudinally extending tracks include a plurality of track holes each regularly positioned along the longitudinal extent of each of the first and second longitudinally extending tracks, and wherein the first and second longitudinally extending tracks are placed on the cargo compartment wall and spaced apart from each other; the first latch is removably attached to the first track and the second latch is removably attached to the second track; the body of the first receiver includes a portion that is removably attached to the first track and the body of the second receiver includes a portion that is removably attached to the second track; and the storage structure to be located in the cargo compartment of the utility land vehicle is selected from the group consisting of a cart, container, rack, cabinet, and shelf.

Another illustrative embodiment of the present disclosure provides a utility land vehicle having a driver compartment and a cargo compartment including a cargo compartment wall. The utility land vehicle cargo compartment comprises: a first longitudinally extending track; a second longitudinally extending track; each of the first and second longitudinally extending tracks include a plurality of track holes each regularly positioned along the longitudinal extent of each of the first and second longitudinally extending tracks; the first and second longitudinally extending tracks are placed on the cargo compartment wall and spaced apart from each other; and a shelve assembly comprising at least one longitudinally extending bracket and a at least one shelf; the at least one longitudinally extending bracket includes spaced apart first and second hangers; the first hanger is configured to removably couple to the first track; the second hanger is configured to removably couple to the second track; and the at least one shelf includes a member that removably couples to the at least one longitudinally extending bracket.

In the above and other illustrative embodiments, the utility land vehicle cargo compartment may further comprise: the member removably couples to the at least one longitudinally extending bracket via a bolt or pin that extends through both the member and the at least one longitudinally extending bracket; a plurality of pins wherein each pin engages each one of the first and second hangers, wherein each pin is disposed through at least one of a plurality of track holes on the first and second longitudinally extending tracks; and the at least one shelf selectively folds with respect to the at least one longitudinally extending bracket.

Additional features of the present disclosure will become apparent to those skilled in the art upon considering the following description exemplifying the disclosure as presently perceived.

BRIEF DESCRIPTION OF DRAWINGS

The present disclosure will be described hereafter with reference to the attached drawings which are given as non-limiting examples only, in which:

FIGS. 13A, 13B, and 13C are perspective, reverse perspective, and interior views of latching bars;

Corresponding reference characters indicate corresponding parts throughout the several views. The exemplification set out herein illustrates an embodiment of the disclosure, and such exemplification is not to be construed as limiting the scope of the disclosure in any manner.

DETAILED DESCRIPTION OF DRAWINGS

Figure 1:
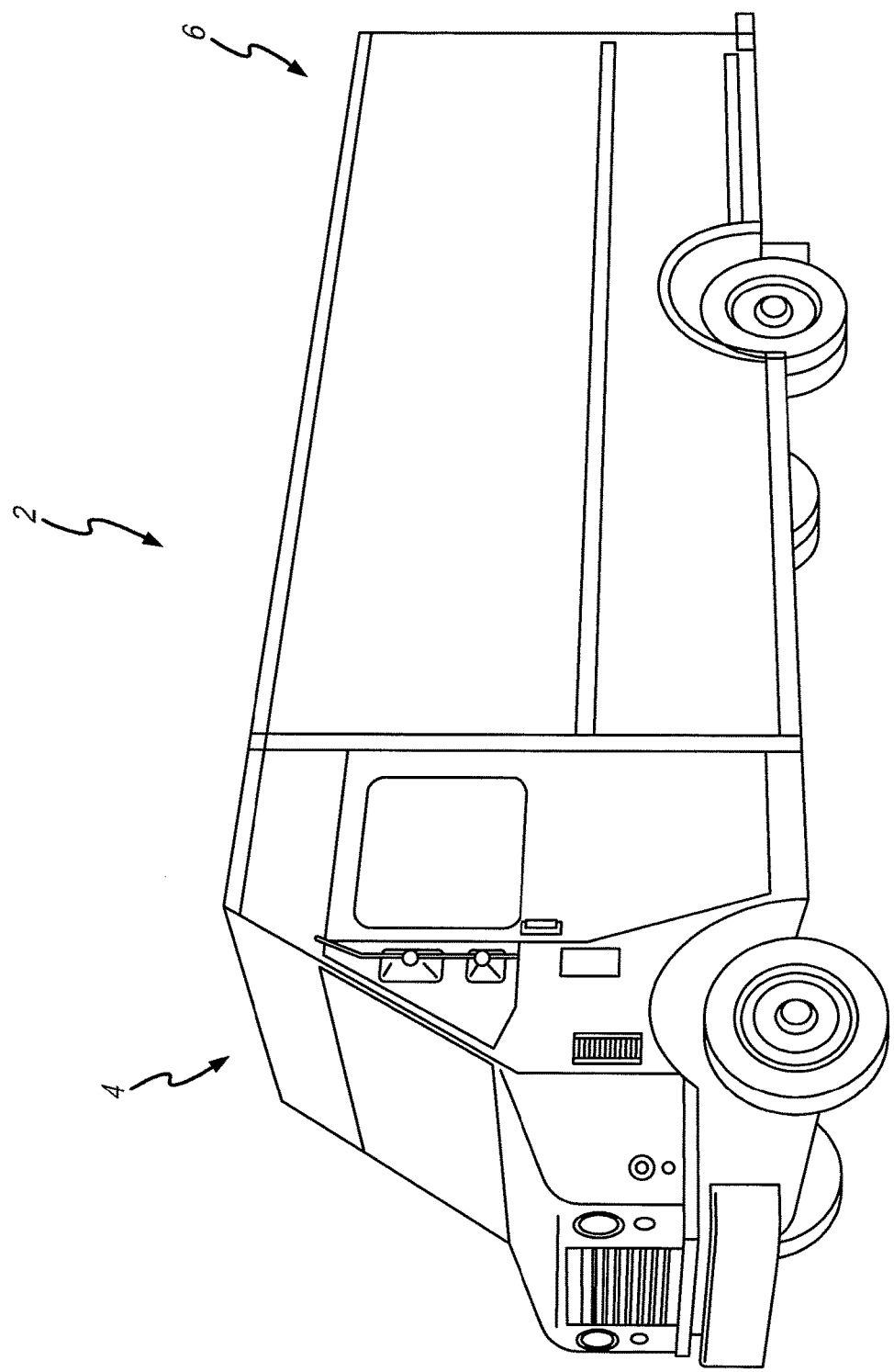
FIG. 1 is a perspective view of a cargo/delivery vehicle.

The figures and descriptions provided herein may have been simplified to illustrate aspects that are relevant for a clear understanding of the herein described structures, while eliminating, for the purpose of clarity, other aspects that may be found in typical structures. Those of ordinary skill may recognize that other elements and/or operations may be desirable and/or necessary to implement the structures described herein. Because such elements and operations would be known in the art, and because they do not facilitate a better understanding of the present disclosure, a discussion of such elements and operations may not be provided herein. The present disclosure, however, is deemed to inherently include all such elements, variations, and modifications to the described aspects that would be known to those of ordinary skill in the art.

An illustrative embodiment includes a retention system that may be used to receive brackets that attach to carts being or other structures stored inside the vehicle. Illustratively, the carts may be configured to include a locking bracket that includes axially opposed and spaced apart latch bars. It is appreciated that the cart might have one or a plurality of lock brackets. Each latch bar is configured to be received in either a latch assembly, or a receiver assembly attached to the vehicle. The latch assembly illustratively may include a rotary latch, such as a Hansen brand 450 rotary latch, that is selectively engageable with the latch bar of the lock bracket on the cart. The opposed and spaced apart latch bar on the lock bracket may then be configured to engage a receiver assembly. The receiver assembly is configured to selectively hold the latch bar by receiving it in a channel-like structure. In one illustrative embodiment, the receiver assembly may not latch the latch bar in the same manner as the latch assembly does. Instead, the receiver assembly includes a channel that the opposed latch bar fits into. The channel does not lock the opposed latch bar in place. Rather, it holds the opposed latch bar while the latch assembly locks the latch bar in place. This allows the operator to simply engage one structure to unlatch the latch bar and then remove the cart from its securement to the cargo vehicle. This saves time when compared to multiple latch assemblies that have to be activated separately and sequentially in order to remove the cart. Alternatively, a latch assembly may be used in place of a receiver assembly for some applications.

In another embodiment, the cart may include a plurality of lock brackets, each having spaced apart axially opposed latch bars. In this embodiment, the cargo vehicle may include multiple sets of latch and receiver assemblies which each engage the corresponding lock bracket. Further in this embodiment, the multiple rotary latches are tethered together by a cable or other structure that when engaged may essentially simultaneously move both latches so, again, the operator can release the cart with just one motion or operation. It is further appreciated that any number of such latches and receivers may be employed as needed depending on what lock brackets are attached to the carts. It is even further appreciated that any variety of carts may be used including, but not limited to, mat carts with or without shelves, soiled linen carts, box carts, and wheel well carts. In an illustrative embodiment, the plurality of latch and receiver assemblies may be attached to the side or end walls of the cargo compartment. The carts may then be lined up and each selectively attached to a set of latch and receiver lock assemblies on the vehicle. This allows multiple carts to be kept in the cargo compartment of a single vehicle while preventing them from moving therein until they are released by the operator.

Illustrative embodiments of the present disclosure are described herein with regard to the following Figures. A perspective view of a cargo/delivery vehicle 2 such as a van or truck is shown at FIG. 1. Delivery vehicle 2 illustratively includes a driver compartment 4 and cargo compartment 6. Vehicles such vehicle 2 are popularly known for delivering packages, uniforms and laundry, cargo, food, tools, and the like.

Figure 2:
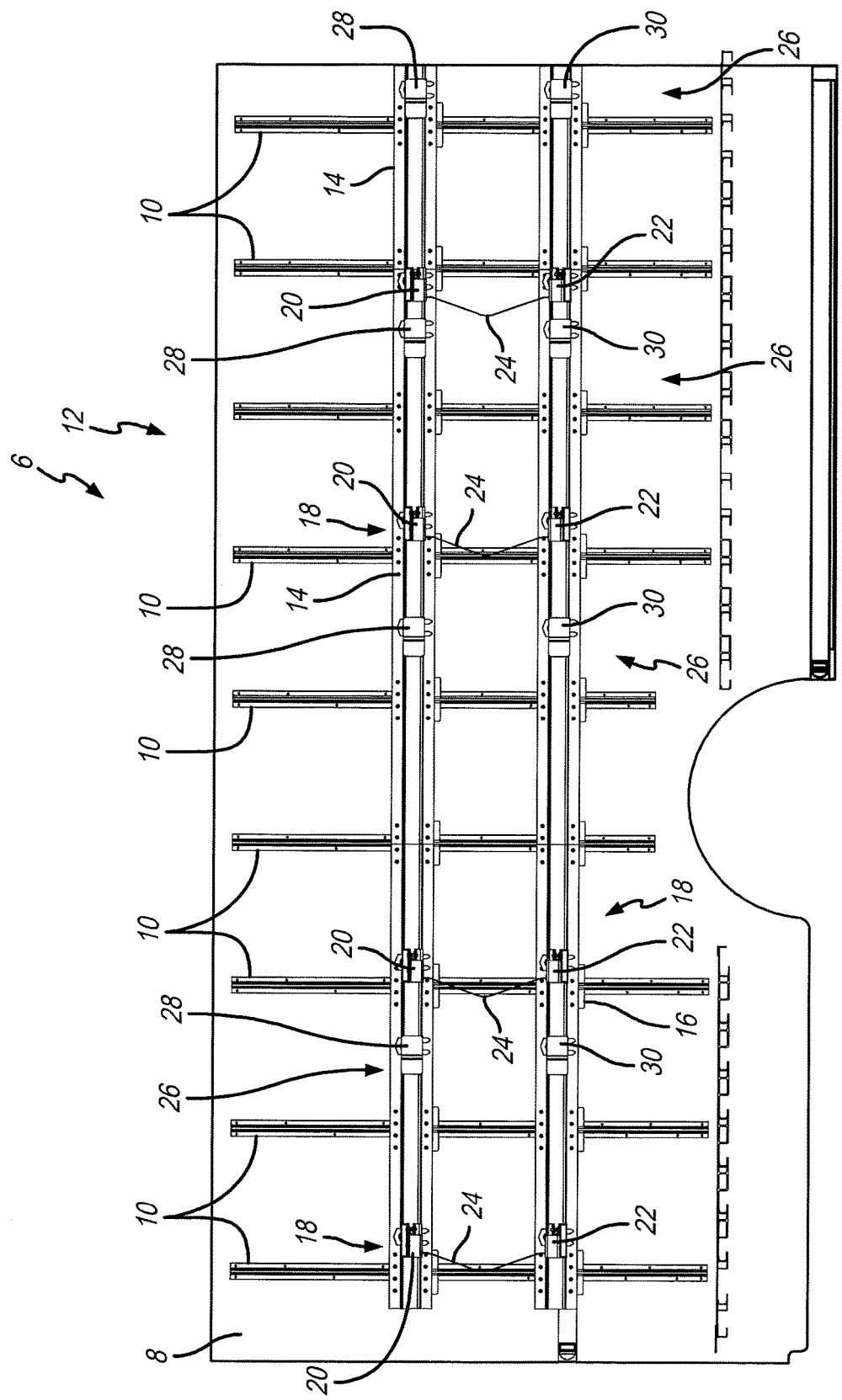
FIG. 2 is a side elevation view of a sidewall portion of a cargo compartment of the cargo/delivery vehicle.

A side elevation view of side wall 8 of cargo compartment 6 is shown in FIG. 2. In the illustrative embodiment, longitudinally extending bracket members 10 are oriented vertically and placed periodically along side wall 8 as shown. As part of a retention system 12 and upper and lower tracks 14 and 16 are spaced apart from each other and extend horizontally across bracket members 10 as shown. Illustratively, upper and lower tracks 14 and 16 are fastened to each track member 10. A latch assembly 18 which is composed of individual latches 20 and 22 are coupled to upper and lower tracks 14 and 16, respectively. Both latches 20 and 22 are coupled to each other via a cable 24. By grasping and moving cable 24, both latches 20 and 22 of latch assembly 18 can be actuated to release whatever structure is attached to said latches. Having spaced apart latches 20 and 22 also provide a secure latching system for carts or other structures that would be attached thereto but in this configuration allow for convenient unlatching using a single hand and single motion. Also attached to upper and lower tracks 14 and 16 is receiver assembly 26 composed of receivers 28 and 30, respectively. Receiver assembly 26 is configured to hold another portion of a cart, shelf, whatever other structure that is also attached to latch assembly 18 to assist securing that structure in place. As will be discussed further herein, although the receiver assembly helps hold the structure it does not latch onto the structure like latch assembly 18. This is so that all that is required to move the structure from its secured position on side wall 6 of vehicle 2 is pulling on cable 24. In other words, the system is configured to provide securement to side wall 8 while providing a convenient mechanism to release same.

Figure 3:
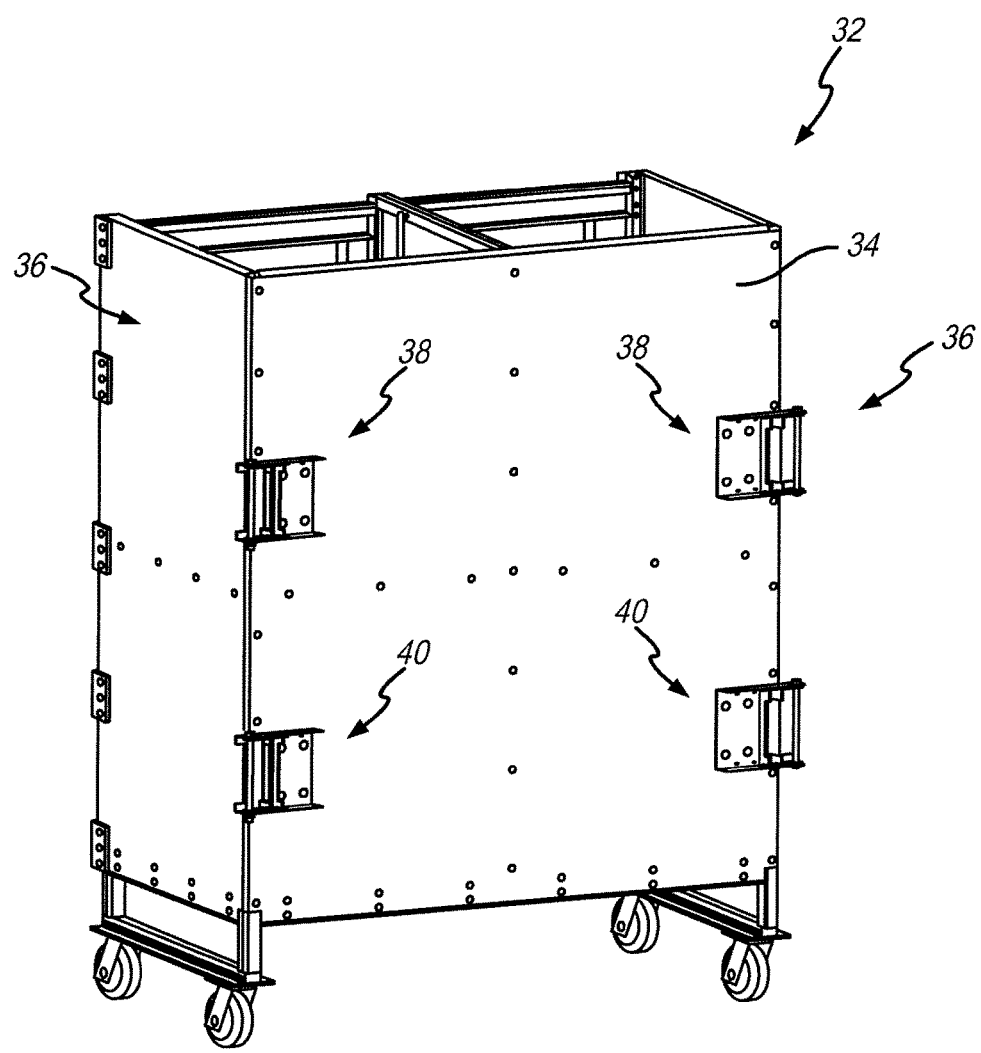
FIG. 3 is a perspective rear view of an illustrative cart.

A perspective rear view of an illustrative cart 32 is shown in FIG. 3. It will be appreciated by the skilled artisan upon reading this disclosure that the configuration of the cart can be of any manner. Whether the cart has shelves, hanger rods, or other structures is encompassed within the scope of this disclosure. As shown herein, cart 32 includes back wall 34 that has latch bar assemblies 36 attached thereto. Each latch bar assembly 36 includes latch bars 38 and 40 that are each spaced apart to coincide with either corresponding latches 20, 22 or receivers 28 and 30. It is further appreciated that upper and lower tracks 14 and 16 may be adjustable at different heights depending on the configuration needed at the time. Latch assemblies 36 can also be moved up or down on cart 34 in order to line up with corresponding upper and lower tracks 14 and 16 as needed. A skilled artisan will understand from reading the present disclosure that tracks 14 and 16, latches 20 and 22, receivers 28 and 30, and latch bars 38 and 40 are all intended to be modular and intended to be adjustable in virtually any direction to create the latching and releasing functionality needed for a particular task or use in cargo portion 6 of vehicle 2.

Figure 4:
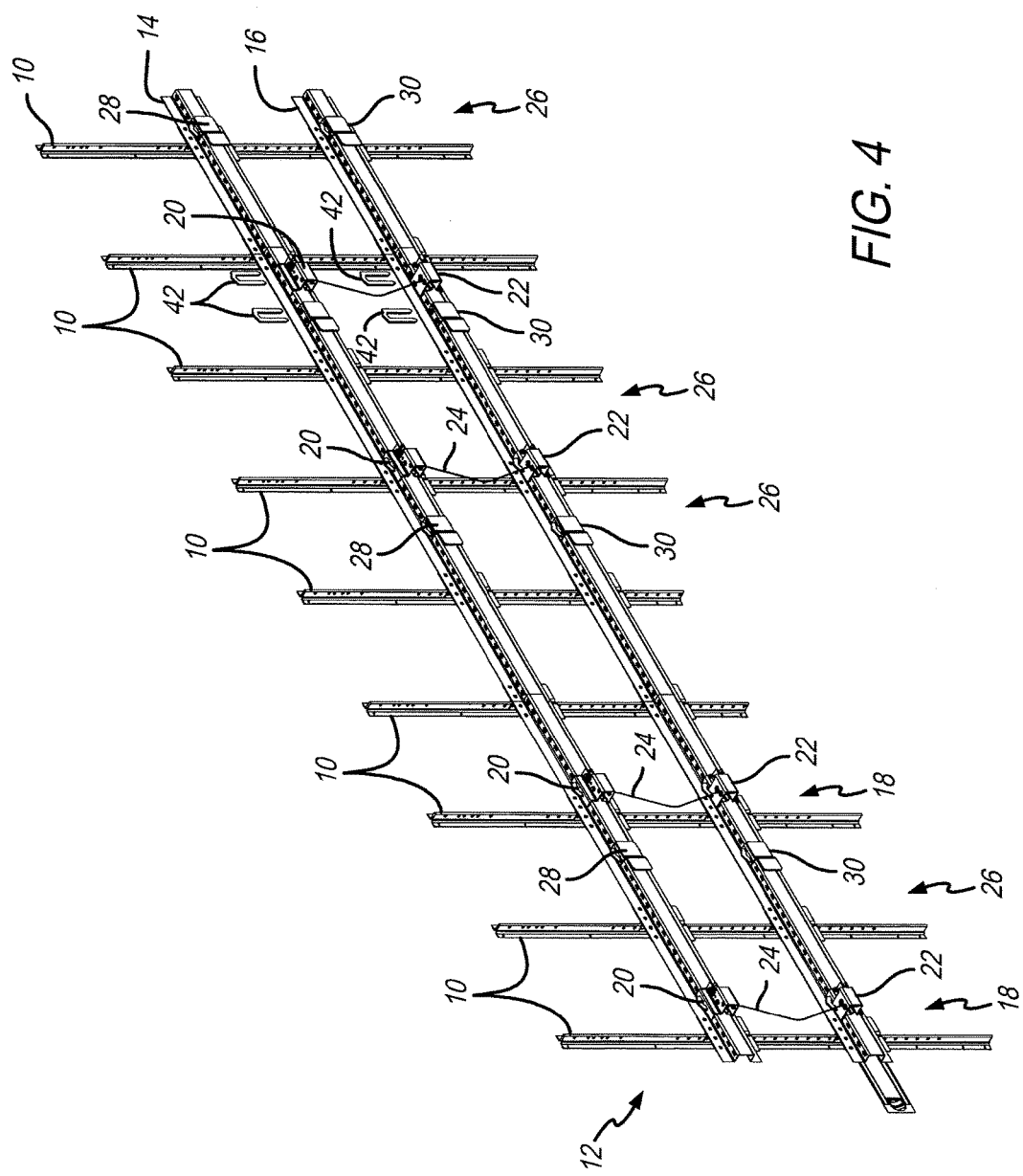
FIG. 4 is a perspective view of the sidewall of the cargo/delivery vehicle.

A perspective view of side wall 8 with bracket members 10 extending vertically is shown in FIG. 4. This view further assists demonstrating how upper track 14 and lower track 16 can be fastened to brackets 10. Also shown are latch assemblies 18 and receiver assemblies 26 periodically spaced on tracks 14 and 16 as shown. It is appreciated that latch assemblies 18 and receivers 26 can be slid back and forth along tracks 14 and 16 and positioned as needed to accommodate whatever particular cart or other structure needs to be secured onto the vehicle wall. With respect to securement, U-shaped pins 42 are configured to secure latches 20, 22 and receivers 28 and 30 onto tracks 14 and 16 via slot openings 44 located thereon. Such slot openings are also disposed through the latches and receivers. Employing such an adjustable attachment means via pins 42 translates into convenient adjustment of the latches and receivers.

Figure 5:
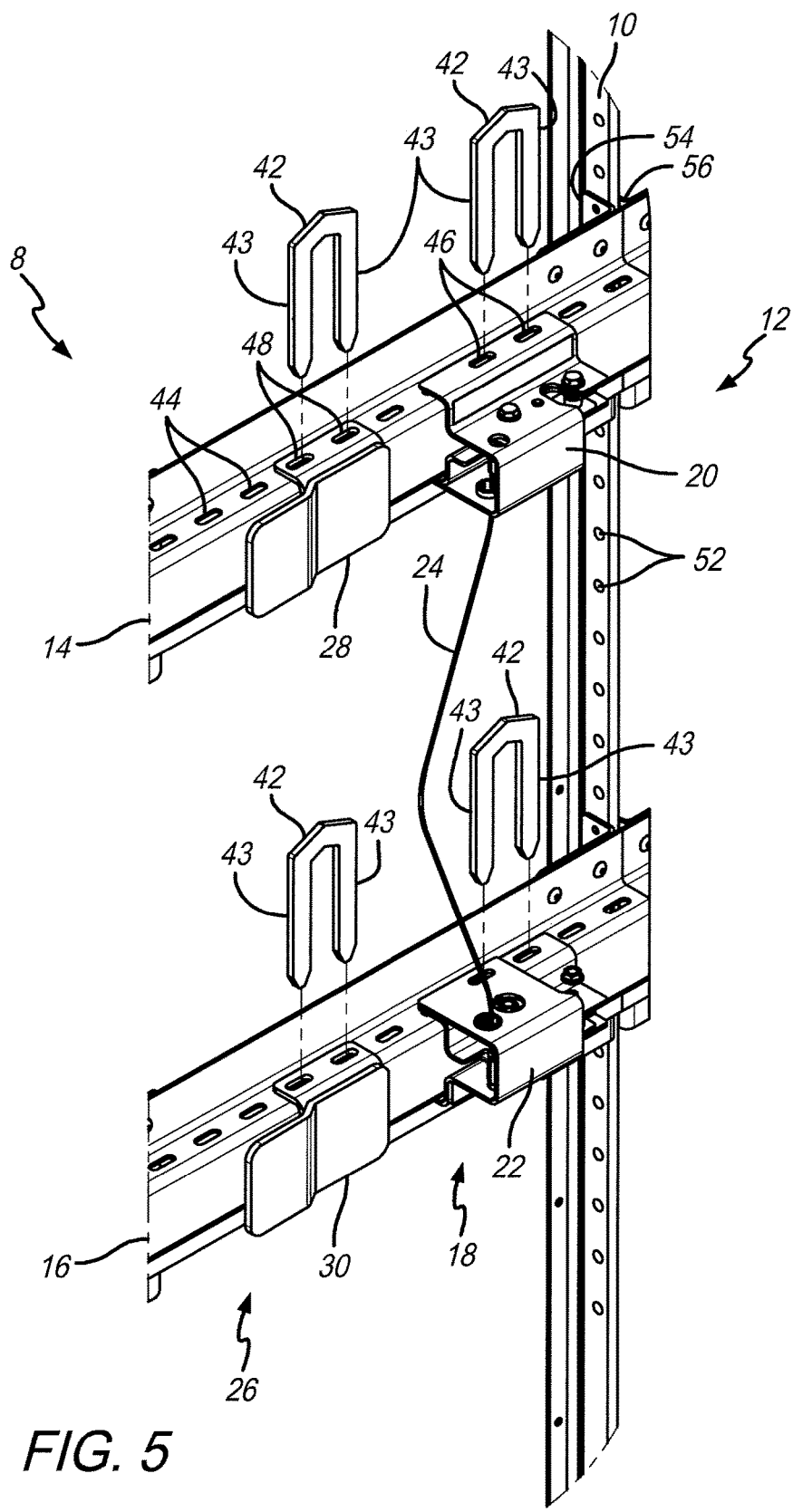
FIG. 5 is a detail view of a portion of the sidewall of FIG. 4.

A detailed view of a portion of side wall 8 and attended structures as identified by "A" in FIG. 4 is shown in FIG. 5. As depicted herein, pins 42 are configured to insert into slot openings 46 or 48 of latch 20, 22, or receiver 28, 30, respectively, on tracks 14 and 16. Pins 42 also extend through the slot openings 44 which align with slot openings 46, 48, respectively to allow pins 42 to insert therein. It is appreciated that in this illustrative embodiment each of tracks 14 and 16 have a "D" shaped profile that is received in a "C" shaped profile provided by latches 20, 22 and receivers 28, 30 thereby providing support for the latches and receivers. In the illustrated embodiment, each pin 42 includes downward depending tines 43 which each insert into slot openings 44 and slots 46 or 48 to secure the latch or receiver to the track. This view further shows illustrative attachment of tracks 14 and 16 to bracket 10. It is appreciated that such securement may be made in any convenient manner that accomplishes the objective of securely fastening tracks 14 and 16 to bracket 10. In the illustrated embodiment, bracket 10 includes a plurality of holes 52 disposed along a portion of bracket 10 providing regularly spaced attachment points vertically along same. Each of brackets 14 and 16 may include flanges 54 and 56 configured to receive a fastener that extends through same along with hole 52 thereby securing the tracks to the bracket. It is appreciated that with regularly spaced holes 52 on bracket 10, either tracks 14 or 16 can be located at virtually any desired height on track 10.

Figure 6:
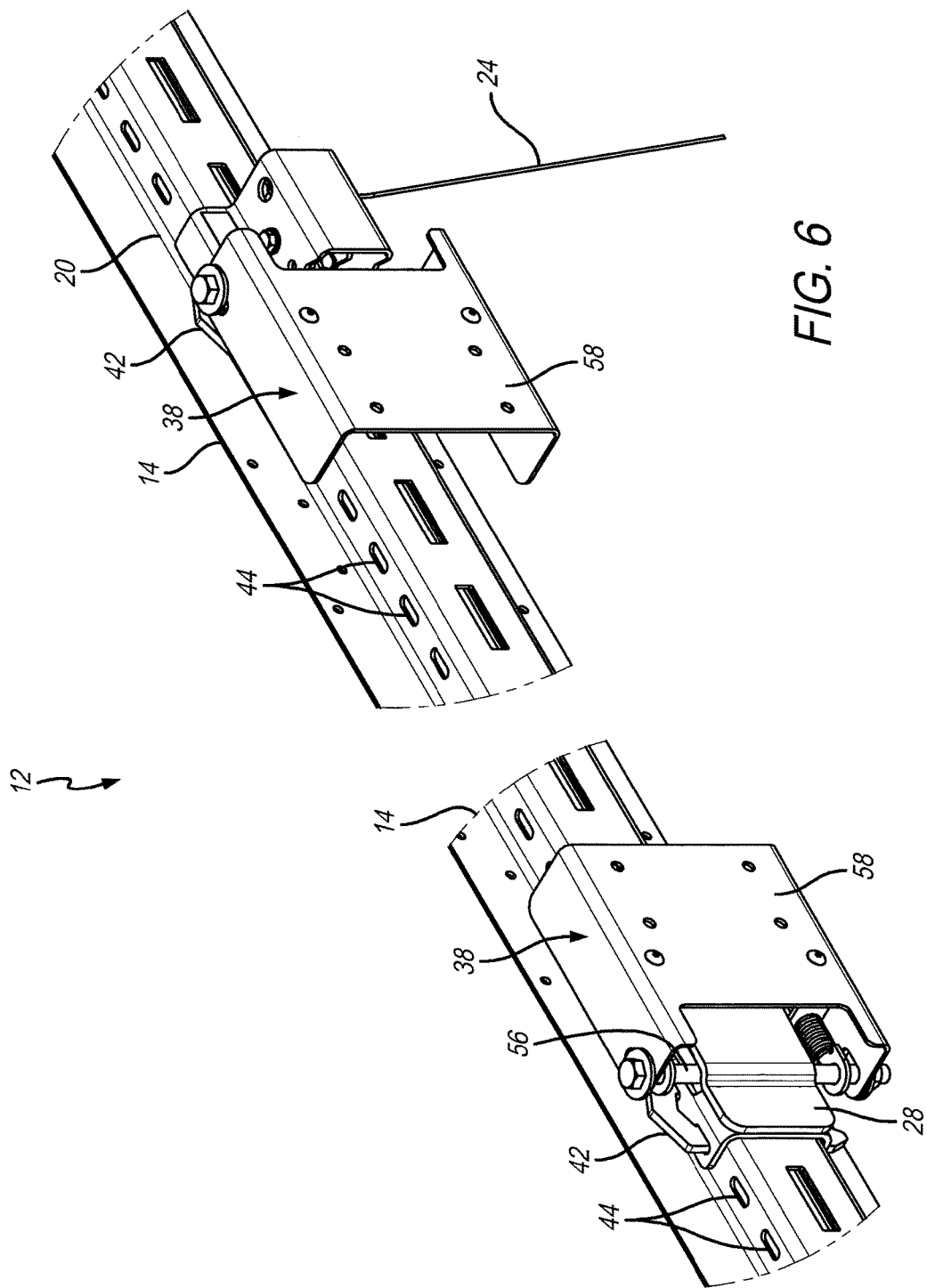
FIG. 6 is a perspective view of the retention system.

A perspective view of retention system 12 is shown in FIG. 6. As depicted, track 14 (or track 16) includes a receiver 28 (or 30) or latch 20 (or 22) which both hold latch bars 38 (or 40) configured to attach to a cart or other structure (such as cart 32 shown in FIG. 3). As will be discussed in further detail herein, each latch bar 38 includes a bar 56 secured to a bracket portion 58 that is securable to either the latch or receiver. This view also shows how pin 42 secures to either the latch or receiver onto track 14 (or 16) through slot openings 44 of same. Also shown in this view is cable 24 extending from latch 20 in FIG. 2 release latch bar 38 from latch 20 upon actuation.

Figure 7:
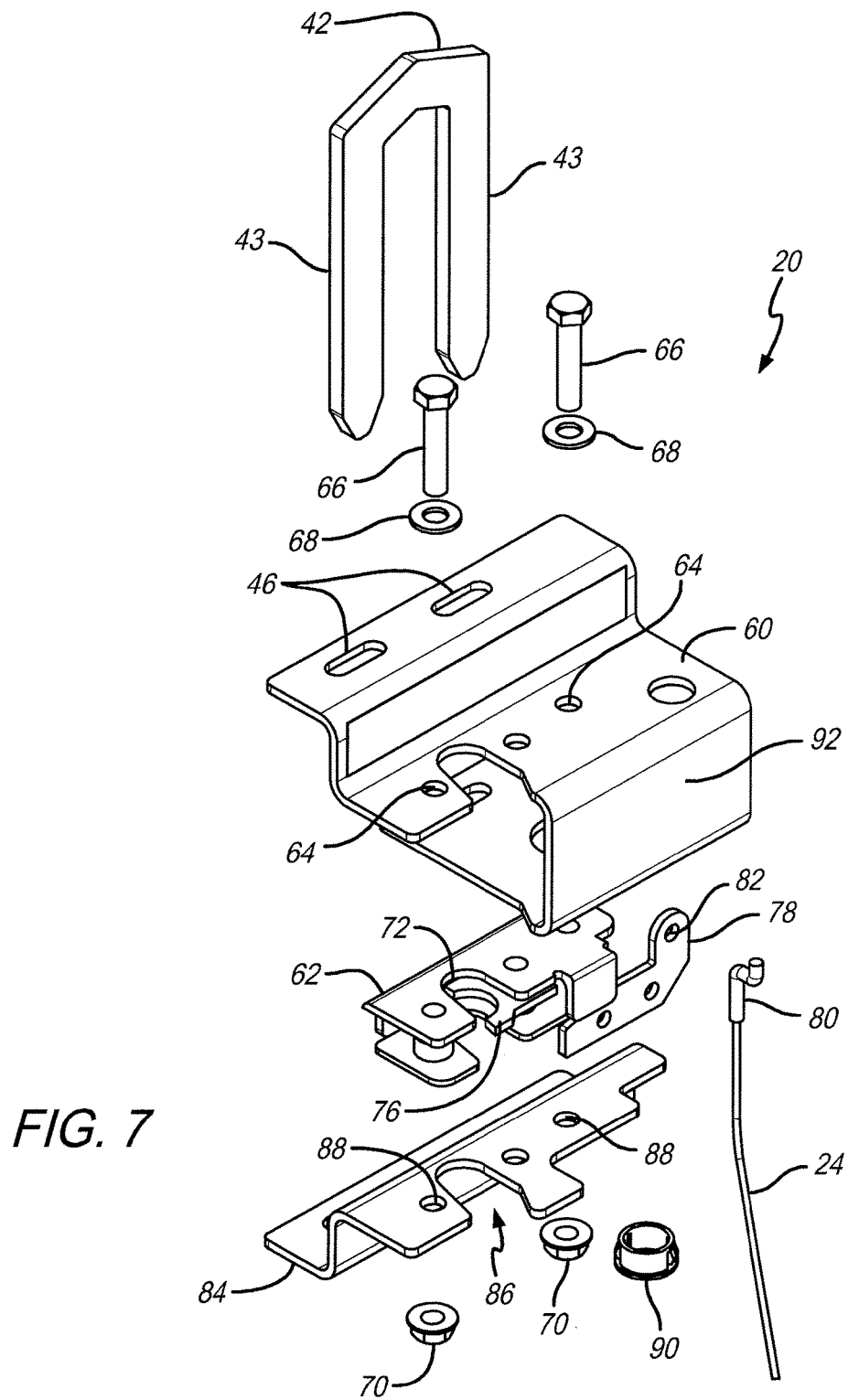
FIG. 7 is an exploded view of a latch assembly.

An exploded view of latch 20 is shown in FIG. 7. As part of the illustrated embodiment, latch 20 includes a latch bracket 60 configured to receive illustrative rotary latch 62. Latch bracket 60 further includes slot openings 46 to receive tines 43 of U-shaped pin 42 and holes 64 configured to receive fasteners 66 which are used to attach the structures that make up latch 20 together. Illustratively fasteners 66 employ washers 68 and nuts 70 to hold latch 20 together. Also shown in this view is latch 62.

Illustratively, latch mechanism 62 may be a rotary latch, and further illustratively, a Hansen 450 rotary latch. Such latches and their operation are known to those skilled in the art. They are, for example, known to receive and secure a bar or other like structure and hold it in place until actuated, at which time the latch will release the bar or like structure. Part of latch mechanism 62 is slot 72 configured to receive the aforementioned bar or other like structure—such as bar 56 from latch bar 38. Latch bracket 60 also includes a similar slot 74 formed for the same purpose. Also included as part of latch mechanism 62 is latching member 76 and latch trigger 78. Latching member 76 as well as associated structures of latch mechanism 62 known to those skilled in the art, when a bar engages latching member 76 it moves to secure bar 56 thereto, preventing bar 56 from moving until released. In order to release bar 56, latching member 76 is moved by actuating latch trigger 78. Such latching and unlatching via these structures are known to those skilled in the art. By attaching cable 24 to trigger 78 actuation of cable 24 is all that is necessary to cause latching member 76 to release bar 56.

An illustrative means of attaching cable 24 to latch trigger 78 is by employing a cable hook 80 attached to cable 24 and configured to be disposed in illustrative hole 82 and latch trigger 78 securing both structures together. Also shown in this view is latch mounting 84 which also includes slot 86 configured to receive bar 56 as well as holes 88 configured to receive fasteners 66. Further shown in this view is a collar washer 90 configured to fit on the perimeter of hole 92 disposed in latch bracket 60. Hole 92 illustratively receives cable 24 and collar washer 90 provides a smooth contact surface for same.

Figure 8:
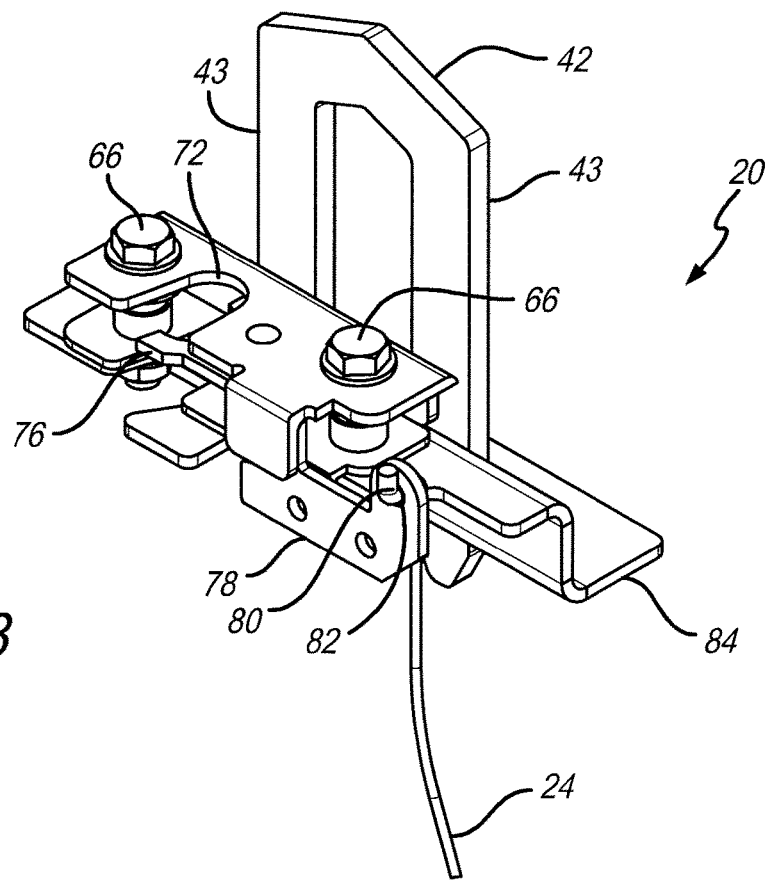
FIG. 8 is a perspective view of a portion of the latch assembly of FIG. 7.

A perspective view of a portion of latch 20 is shown in FIG. 8. This view shows latch mechanism 62 assembled to latch mounting 84. Pin 42 extends through slots (not shown) disposed through latch mounting 84 just like it does through slot openings 46 of latch bracket 60 to ensure latch 20 secures onto either track 14 or 16 as needed. The view in FIG. 8 further shows cable 24 attached to latch trigger 78 via hook 80 disposed through hole 82. It may be appreciated from this view how bar 56 of latch bar 38 can fit into slot 72 and latch mechanism 62 so that latching member 76 secures bar 56 into same. Also shown are fasteners 66 holding latch mechanism 62 to latch mounting 84.

Figure 9A:
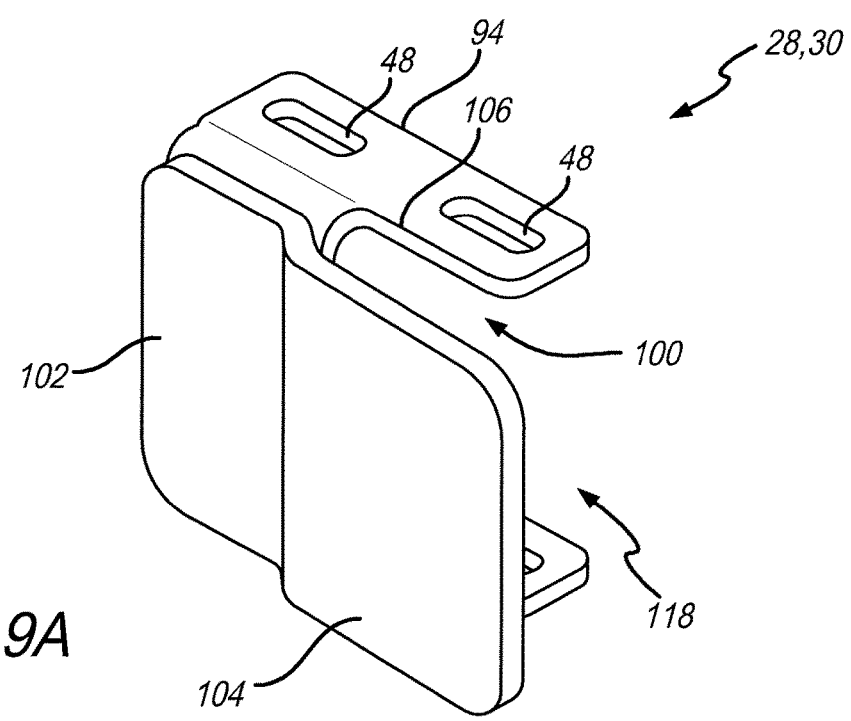
FIGS. 9A, 9B, and 9C are perspective and end views of a receiver.
Figure 9B:
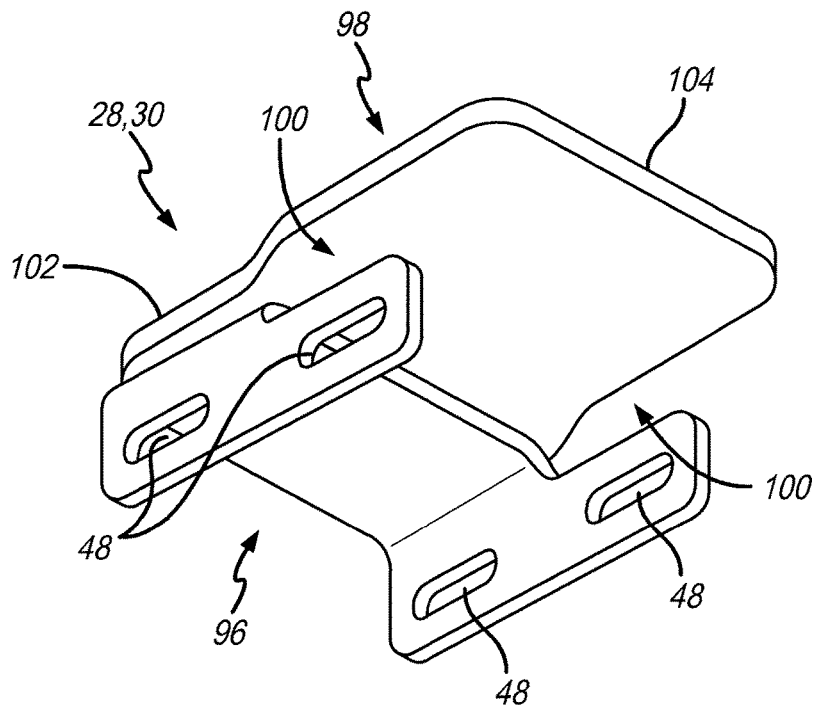
Figure 9C:
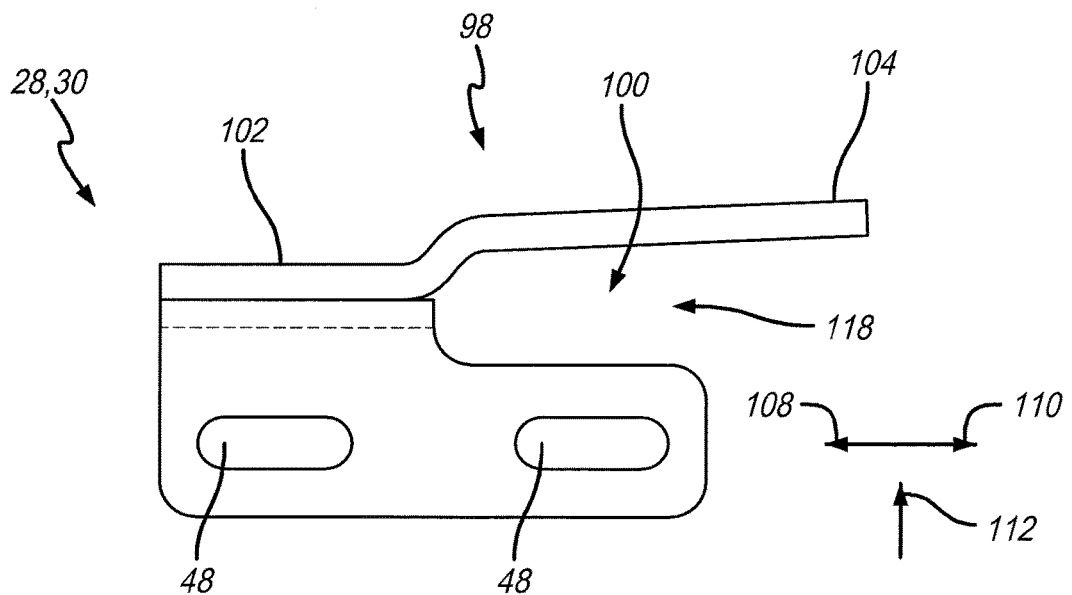

Perspective and end views of receiver 28 (or 30) is shown in FIGS. 9A, 9B, and 9C. As shown in 9A, receiver 28, 30 includes an attachment bracket 94 that has slot openings 48 disposed therein in order to receive tines 43 of pin 42 as previously shown (see FIG. 5). As better seen in FIG. 9B, slot openings 48 appear on both sides of attachment bracket 94. This is because attachment bracket 94 illustratively forms a track channel 96 that fits onto the "D" shape profile of either tracks 14 or 16. Tines 43 are therefore, configured to be disposed through slot openings 48 of attachment bracket 94, slots 44 and either tracks 14 or 16 (which have slot openings 44 on each side of the "D" shape profile as well) and then extend through the other pair of slot openings 48 to secure receiver 28 (or 30) to the track. A receiver panel 98 is configured to attach to attachment bracket 94 as illustratively shown. Such attachment may be made through fasteners, or other known means to the skilled artisan. In this illustrative embodiment, receiver panel 98 includes bracket attachment portion 102 and top receiver panel 104. These two illustrative portions are distinct from each other from the perspective that bracket attachment portion 102 attaches to attachment bracket 94 whereas top receiver panel 104 bumps-out to assist forming a receiver slot 100 located between top receiver panel 104 and a leading edge 106 formed on attachment bracket 94, as illustratively shown. It is appreciated, however, that in other embodiments, the components that form receiver 28 and 30, including slot openings 48 and receiver slot 100, may be of other configuration including a monolithically formed receiver or a receiver that does not require a bump-out on the top panel portion as the attachment bracket portion may provide more of the structure forming the slot. With respect to receiver slot 100, it is configured to receive bar 56 from latch bar 38. Accordingly, and as can be appreciated in the views of FIGS. 9A, 9B, and 9C, bar 56 is guided by top receiver panel 104 into slot 100 by moving in direction 108. It will be appreciated that unlike latch assembly 18, receiver assembly 26, and particularly each receiver 28 and 30 are not intended to latch onto bar 56 preventing it from exiting unless unlatched. Rather, receiver 28, 30 are configured to simply prevent movement of bar 56 out of same in direction 112 as shown in FIG. 9C. Moving bar 56 in direction 110 will allow latch bar assembly 36 to be removed from either receiver 28 or 30. Accordingly, when a cart or other structure is attached to latch assembly 18 and receiver assembly 26, it is being held securely in latch assembly 18 and cannot be removed without unlatching but only prevented from moving in direction 112 away from tracks 14 and 16 when held in receiver assembly 26. But because of the rigid nature of the cart or other structure, when it is held in place by both latch assembly 18 and receiver assembly 26, the cart cannot move away from sidewall 8 until it is unlatched from latch assembly 18 (by pulling cable 24, as previously discussed). But when unlatched, the cart can be moved illustratively in direction 110 which pulls bar 56 out from receiver slot 100 to free the cart from its attachment to the vehicle. It is further appreciated from these views in FIGS. 9A, 9B, and 9C, that receivers 28, 30 are modular in the sense that they can be rotated and attached to either tracks 14 or 16 so that the opening 118 of slot 100 may be directed to either the left-hand side or the right-hand side depending on the application.

Figure 10:
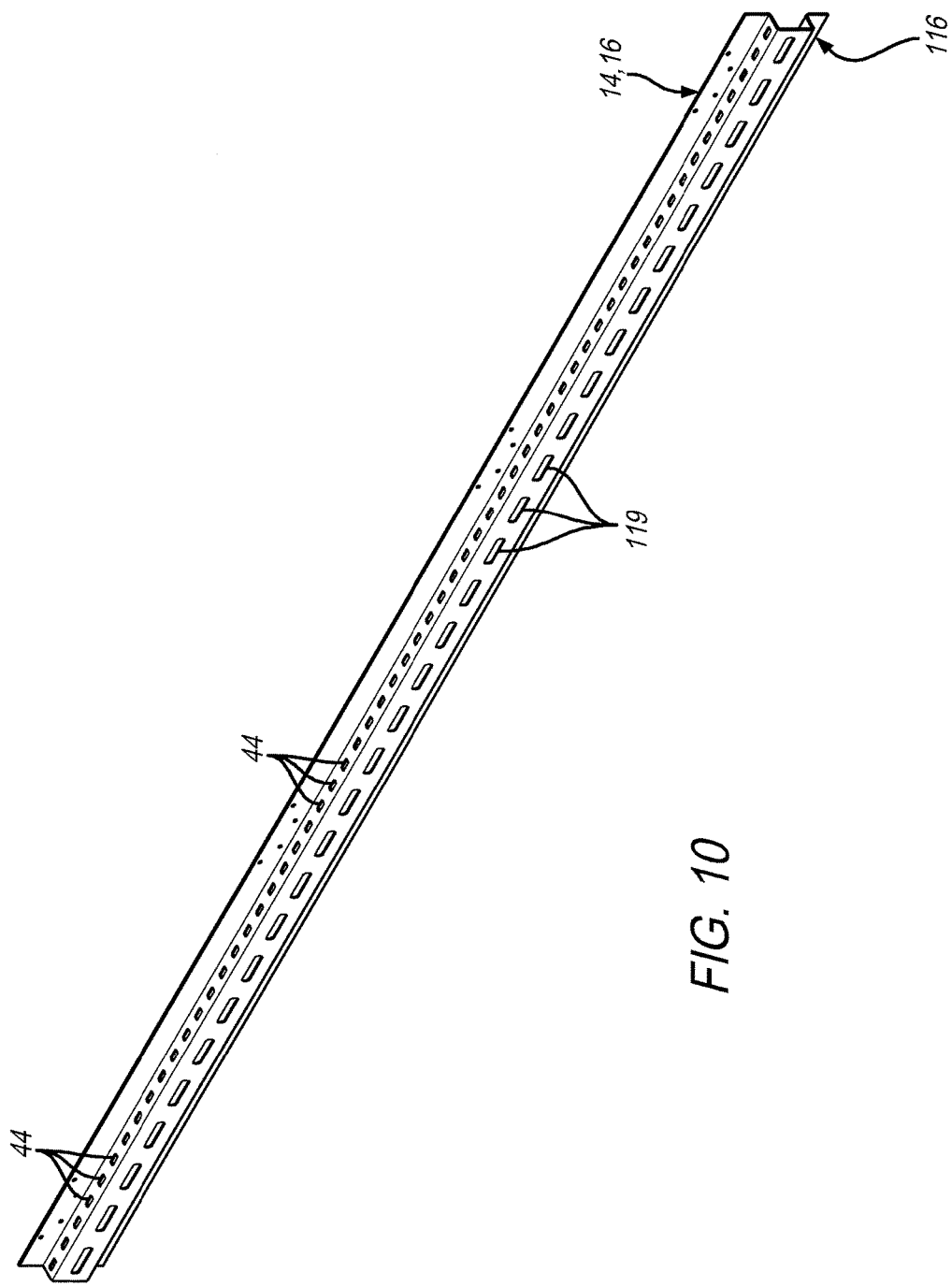
FIG. 10 is a perspective view of a track.

A perspective view of track 14 or 16 is shown in FIG. 10. In the illustrative embodiment as shown in the prior figures, tracks 14 and 16 are identical to each other. In other embodiments, the tracks may be different. Also shown in this view is the "D" shape profile 116 of track 14, 16. On top of the profile are slots 44 that are spaced regularly along the longitudinal extent. It is appreciated that a matching set of slot openings may be likewise placed on the underside of the "D" shaped profile 116 coincident with slot openings 44 to allow tines 43 of pin 42 to extend all the way through the "D" shaped profile of track 14, 16. In the illustrated embodiment, additional slot openings 119 are regularly spaced along the basic surface of "D" shaped profile 116. The slots may be used to receive other attachments to expand the utility of track 14, 16.

Figure 11:
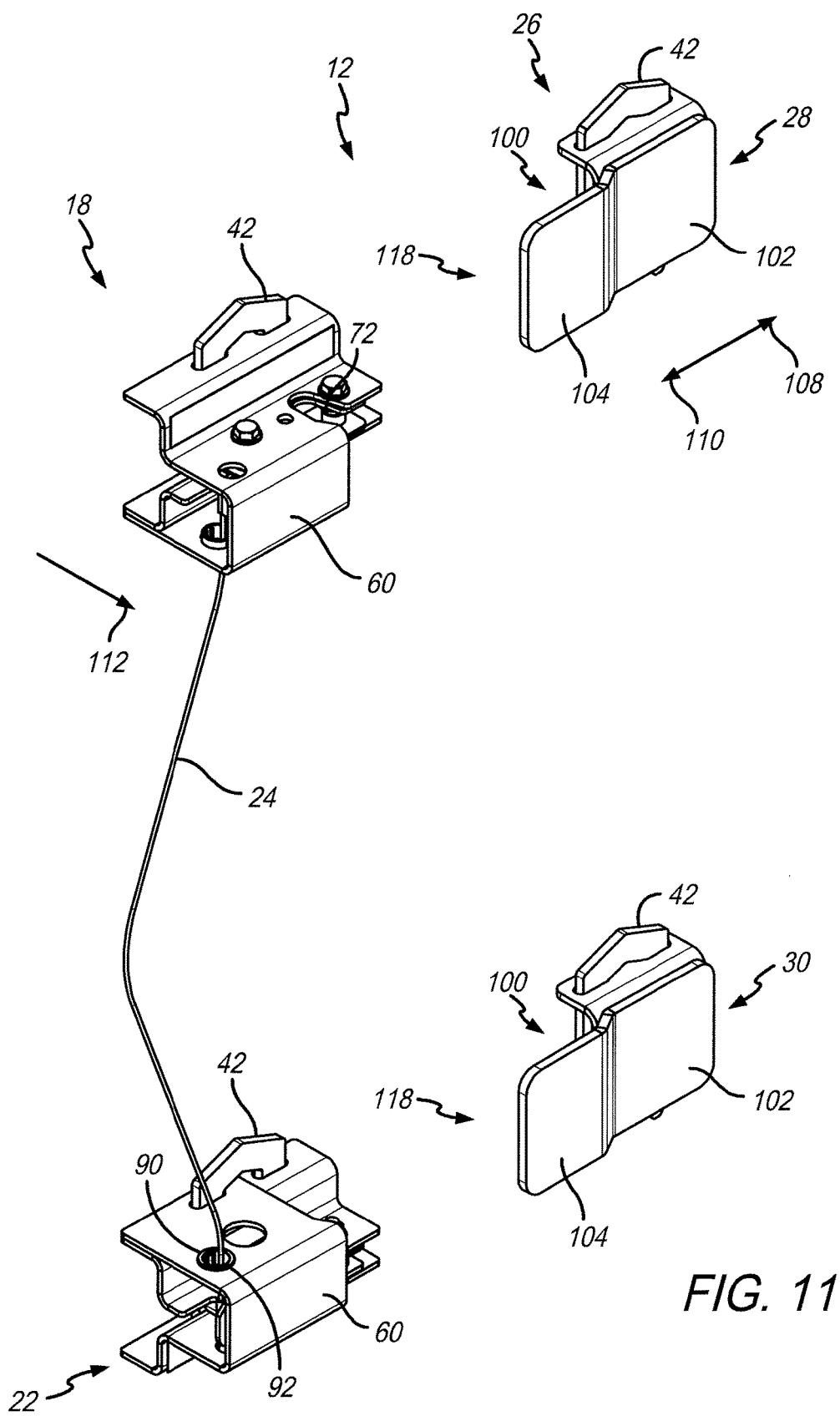
FIG. 11 is a top perspective view of the retention system portion of the retention system.

A top perspective view of retention system 12 is shown in FIG. 11. This view shows both latch assembly 18 and receiver assembly 26 opposing each other. In this illustrative embodiment, latch assembly 18 is shown including both latches 20 and 22. It is appreciated that the slots 72 and both latches 20 and 22 are directed towards slot openings 118 of slots 100 and receivers 28 and 30. And even though in this embodiment slot 72 do not face slot openings 118, they are on the same side as openings 118. Bar 56 located in slot 72 can be moved in direction 112 when decoupled from either latch 20 and 22 which allows a separate bar 56 that would be located in slot 100 of either receiver 28 or 30 to be moved in direction 110 to release the cart or other structure from retention assembly 12. It is further appreciated that this can be done by pulling on cable 24 coupled to both latch triggers 28 on latches 20 and 22 to release bar 56 from latching member 76 (see, also, FIGS. 7 and 8). It is appreciated from this view that latches 20 and 22 can be modular. This means that they are substantially the same structure but one reversed to insure slot 72 and latching member 76, among other structures, face the same direction to create dual, and spaced apart latching points to selectively receive and hold bar 56 onto walls 8 of cargo compartment 6.

Opposite bracket assembly 18 are the slot openings 118 of each receiver 28, 30 of receiver assembly 26. It can be appreciated here that separate bars 56 can each fit into slots 100 of receivers 28 and 30. As shown in FIG. 3, as well as further embodiments, a cart may have corresponding pairs of latch bar assemblies 36 each composed of latch bar 38 and 40 such that one pair including bars 56 engage and latch to latches 20 and 22, whereas the opposing pair (again, see, FIG. 3) fit into slots 100 of receivers 28 and 30. By doing this, the cart or other appropriate structure will remain secured to tracks 14 and 16. To remove cart, all that needs to be done is pull on cable 24 connected to both latches 20 and 22 thereby releasing latching member 76 of both thereby freeing bars 56 from latches 20 and 22. After this, separate bars 56 of latch bars 38 and 40 of opposing latch bar assemblies 36 located in slots 100 of receivers 28 and 30 can be slid out in direction 110 until they clear top receiver panel 104 which frees the cart from retention assembly 12.

Figure 12:
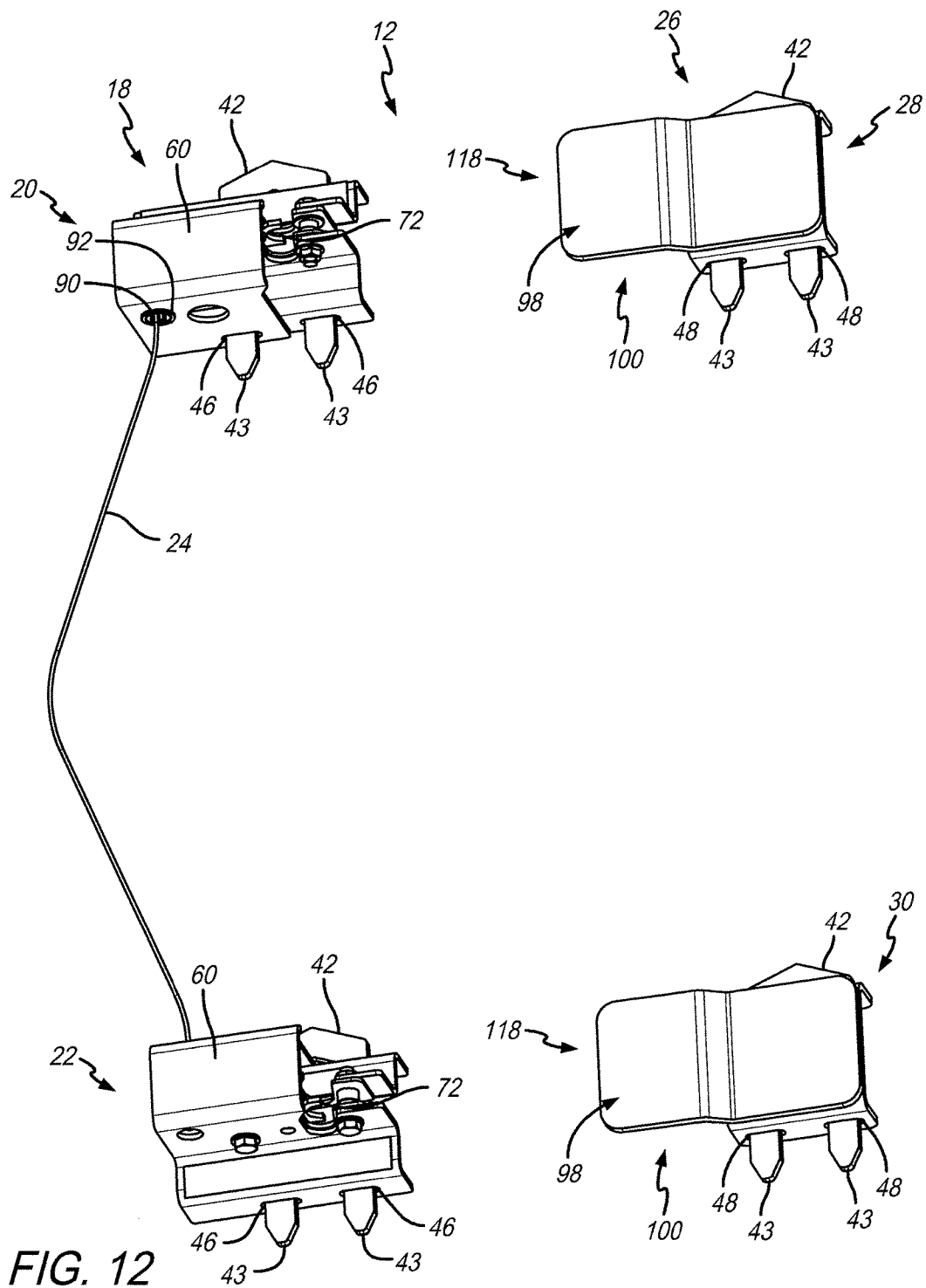
FIG. 12 is an underside perspective view of the retention system.

An underside perspective view of retention system 12 is shown in FIG. 12. The structures are the same as that shown in FIG. 11. This view further reinforces that latches 20 and 22 are the same but wherein latch 22 is reversed. This allows latch trigger 78 from latch 20 to face latch trigger 78 from latch 22 allowing both to couple to cable 24, as previously discussed. This means that pulling on cable 24 engages both latch triggers 78 on latches 20 and 22 causing latching member 76 on both latches 20 and 22 to disengage. This allows latches 20 and 22 to release corresponding bars 56 from latch bars 38 connected to a cart, or other appropriate structure, to release same from retention system 12. Also shown in this view are receivers 28 and 30.

This view also demonstrates how pins 42 are employed to extend illustratively all the way through each of latches 20, 22 and receivers 28 and 30. As can be seen, tines 43 from each of pins 42 not only extend through slot openings 46 of the top side of latches 20 and 22 but also through slot openings 46 on the bottom side of the same latches 20 and 22. Similarly, tines 43 extend through bottom slot openings 48 on receivers 28 and 30 similar to being disposed through slot openings 48 of the top side of same. It is appreciated that by extending such pins through both the latch (or receiver) and corresponding track, a secure hold is made between the latch (or receiver) and the track.

Perspective, reverse perspective, and interior views of latching bars 38 are shown in FIGS. 13A, 13B, and 13C. As first shown in FIG. 13A, latching bar 38 includes bar 56 and bracket 58. Bar 56, as previously discussed, is the structure that fits into either latches 20, 22 or slots 100 in receivers 28 and 30. Bracket 58 is an illustrative U-shaped bracket configured to support bar 56 at each upward extending wall 122, 124 as illustratively shown. Bracket 58, also as shown in FIG. 3, is intended to fasten onto a cart (such as cart 32) or other like structure intended to be selectively secured to the sidewalls 8 of cargo compartment 6 of vehicle 2. Such fastening may be through fasteners such as screws or bolts or bracket 58 may be welded to the cart. To assist in providing tolerance when moving cart such as cart 32 into and out of retention system 12, bar 56 is movable within slots 126 and 128 of walls 122 and 124, respectively. A plunger 130 is movable along guides 132 and 134 as illustratively shown. Springs 136 and 138 are illustratively disposed on guides 132 and 134, respectively, to bias bar 56 in direction 108. Accordingly, placing bar 56 into slot 100 of either receiver 28 or 30, and pushing bar 56 against the direction of bias 110 assists placing another bar 56 into latch 20. Conversely, having the tolerance of a movable bar 56 within slots 126 and 128 makes it easier to remove latching bar 38 from receivers 28 and 30. It is appreciated, however, that the amount of movement by bar 56 in directions 110 and 108 within slots 126 and 128 are limited and is not long enough to be able to move out of slot 100 in either receiver 28 or 30 while one bar 56 is located in slot 100 of receiver 28 and 30 and an opposing bar 56 is latched onto either latch 20 or 22. The view in FIG. 13A further depicts plunger 130, guides 132, 134, and corresponding springs 136 and 138 to act on bar 56 in direction 108 within slots 126 and 128. As can be further appreciated in view of FIG. 13C, latching bars 38 are modular, meaning they can be oriented in different, and even in opposite directions, yet serve the same functions. Additionally, bars 56 may be used with both latches and receivers.

Figure 14A:
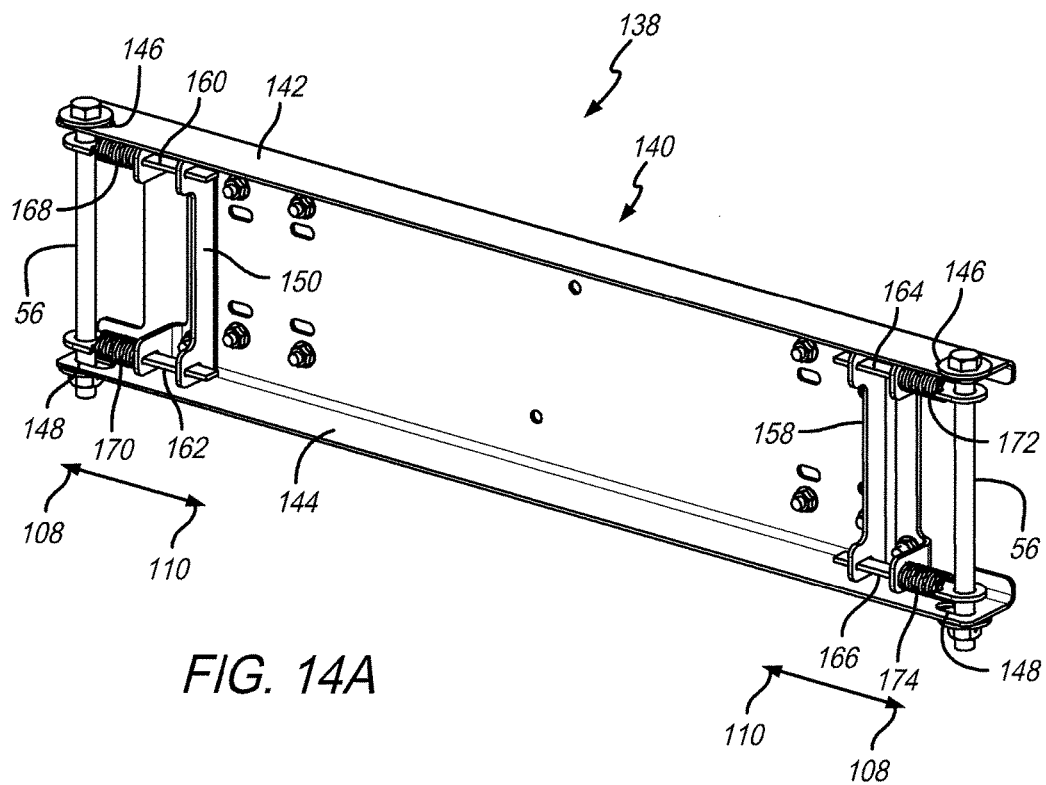
FIGS. 14A and 14B are perspective interior views of another illustrative embodiment of a latching bar.
Figure 14B:
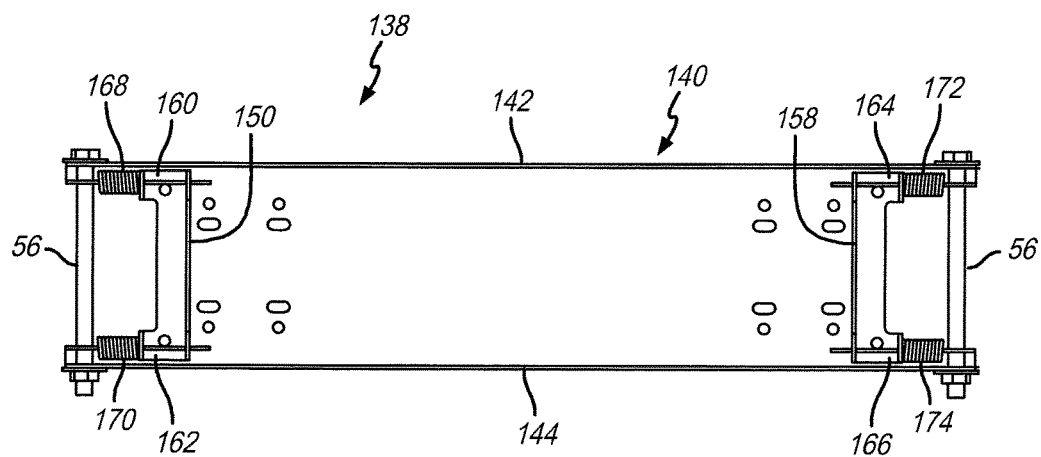
Figure 15:
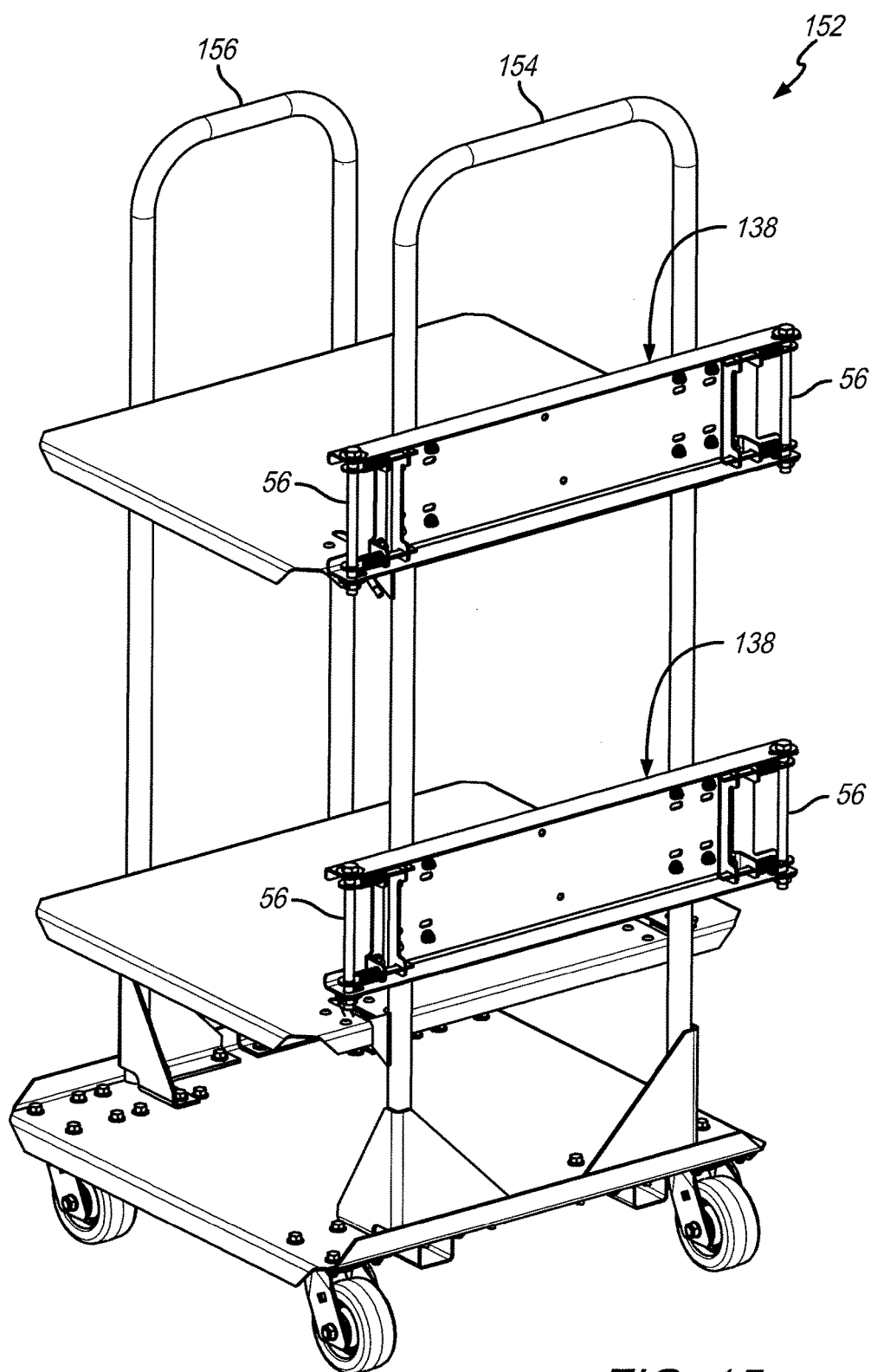
FIG. 15 is a rear perspective view of a cart.

Another illustrative embodiment of a latching bar 138 is shown in the perspective and interior views of FIGS. 14A and 14B. Latching bar 138 is similar to latching bar 38 except this alternative embodiment includes a single bracket 148 that includes a bar 56 at both opposing ends of same. Latching assembly 138 may be useful for applications where two separate latching bars (such as 38 and is used in FIG. 3) cannot be employed. Illustrative cart 152 shown in FIG. 15, is based on a frame configuration such as frames 154 and 156 that may not structurally be conducive to holding separate latching bars. Accordingly, latching bar 138 in FIGS. 14A and 14B have the frame bracket 140 that can be sized wide enough to span frame members such as frame member 154 (see FIG. 15) to secure such carts to retention system 12. In the illustrative embodiment, frame bracket 140 includes side walls 142 and 144 that have slots 146 and 148 disposed adjacent each end to receive the opposing bars 56, as shown in FIGS. 4A and 4B. Similar to latching bar 38, plunger assemblies 150 to 158 are included with latching bar 138 similar to plunger 130 as discussed with respect to FIGS. 13A, 13B, and 13C. Each plunger 150, 158 includes guides 160, 162, and 164, 166 that defines movement of plungers 150 and 158, respectively. Springs 168 and 170 are disposed about guides 160 and 162, respectively, to bias bars 56 outwardly from frame bracket 140 in directions 108. In this illustrative embodiment, the direction 108 is indicative of the bias direction towards either the latch assembly 18 or receiver assembly 26. Similarly, springs 172 and 174 are disposed about guides 164 and 166, respectively, to bias bar 56 in direction 108, as previously discussed. Despite the differences in appearance, latching assembly 138 operates in the same manner as multiple latching assemblies 38 discussed previously.

Figure 16:
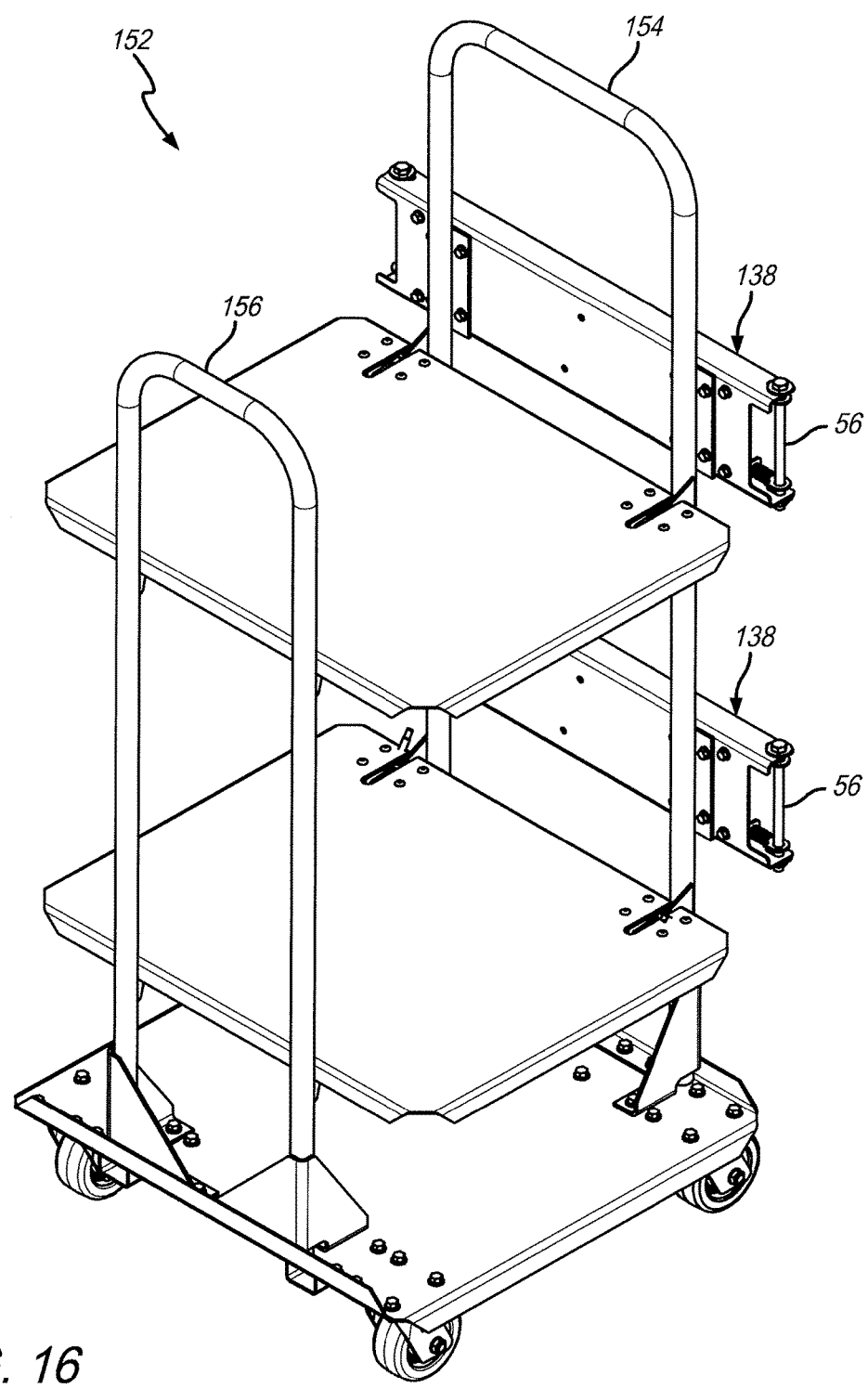
FIG. 16 is a front perspective view of the cart of FIG. 15.

Rear and front perspective views of cart 152 is shown in FIGS. 15 and 16, respectively. The view in FIG. 15 further includes latching bars 138 fastened to frame 154 of cart 152. This view further illustrates how latching bar 138 is useful to secure onto a cart of different configuration than that shown with respect to cart 32 in FIG. 3. It is appreciated from this disclosure that carts of other configuration may be employable with retention system 12.

Figure 17:
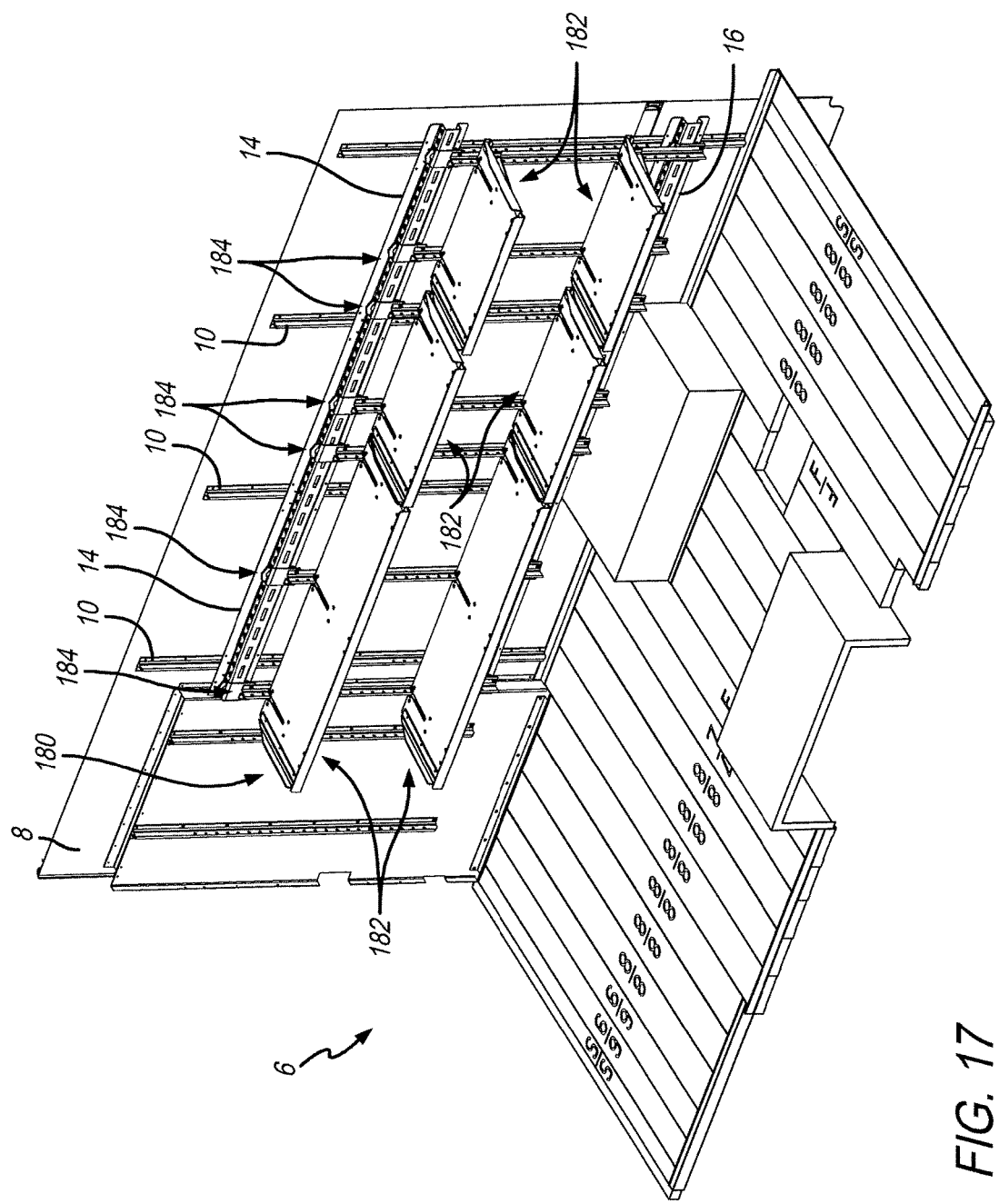
FIG. 17 is another illustrative embodiment of a retention system.

Another illustrative embodiment of the present disclosure includes a retention system 180 affixed to a cargo area side wall as shown in FIG. 17. This embodiment of retention system 180 and shelve assemblies 182 are configured to attach to tracks 14 and 16 in similar manner to that described with respect to retention system 12. In this illustrative embodiment, shelve assemblies 182 may be of various size and pivotally attached to vertically oriented shelf bracket assembly 184, each of which being coupled to tracks 14 and 16. It is appreciated with this system 180 that the shelves and brackets are modular with the shelves being different sizes to accommodate various potential needs. With the regularly spaced slot openings 44 (see FIG. 10) it is contemplated that shelf bracket assembly 184 may be placed anywhere along tracks 14, 16 in order to place shelf assemblies 182 to a desired location. It is appreciated that shelve assemblies 182 may be of the type disclosed in U.S. Pat. No. 7,757,615 (the disclosure of which is incorporated herein by reference). It is additionally contemplated that variations to the shelve assemblies 182 disclosed, in said patent as well as other folding or non-folding shelves, may be included as alternate embodiments.

Figure 18A:
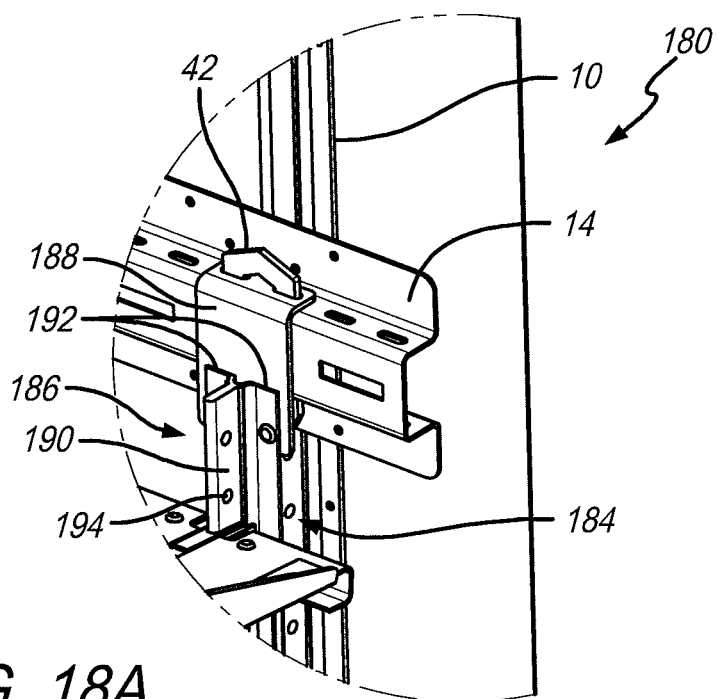
FIGS. 18A and 18B are detailed views of the retention system of FIG. 17.
Figure 18B:
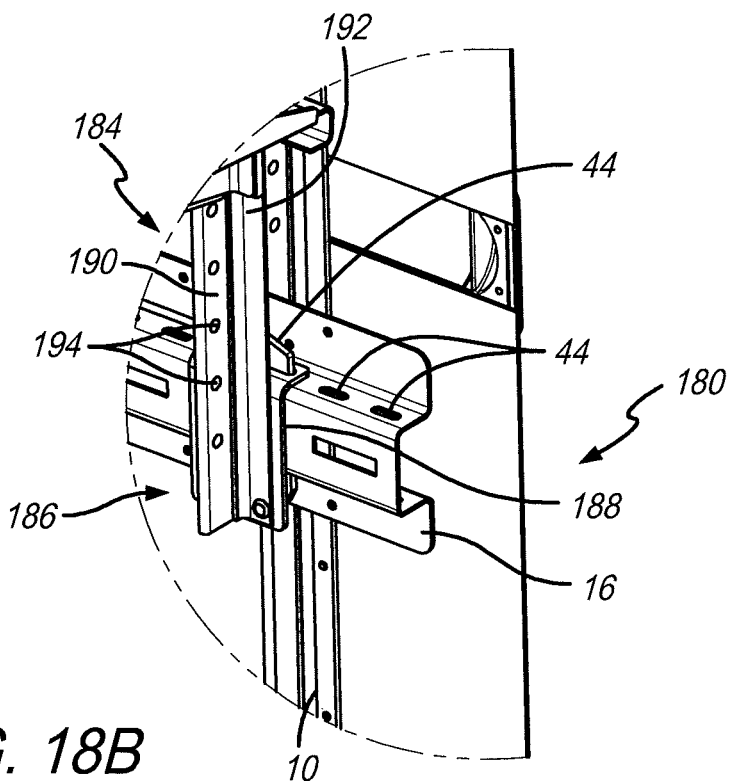

Detailed views of retention system 180 are shown in FIGS. 18A and 18B. These figures show how shelf bracket assembly 184 attaches to track 14 and 16, respectively. It is appreciated in this illustrated arrangement that track 14 is the top track and track 16 is the bottom track, both of which being oriented substantially horizontal and parallel to each other. As shown, shelf bracket assembly 184 is composed of a T-stud bracket 186 connected to a hanger 188. With respect to the T-stud bracket, it is composed of an outwardly extending member 190 with flanges 192 extending substantially perpendicular to outwardly extending member 190 at an end thereof, as illustratively shown. Outwardly extending member 190 also includes regularly spaced holes 194 which are regularly placed along the longitudinal extent of member 190. Holes 194 are configured to receive pins or fasteners that secure shelve assemblies 182 to shelf bracket assemblies 184. With respect to hangers 188, they include slot holes corresponding to slot holes 44 located as illustratively shown on tracks 14, 16. Pin 42, similar to the prior embodiment with its tines 43 is configured to extend through the slots in hanger 188 and slots 44 in track 14 (or track 16 for the lower portion of shelf bracket assembly 184) to secure shelve assemblies 182 to side wall 8 of cargo compartment 6. The ability to slide pin 42 in and out of both hangers 188 and tracks 14, 16, enables a multitude of different configuration options with respect to shelve assemblies 182 since shelf bracket assemblies 184 may be placed almost anywhere along the horizontal longitudinal extent of tracks 14, 16.

Figure 19:
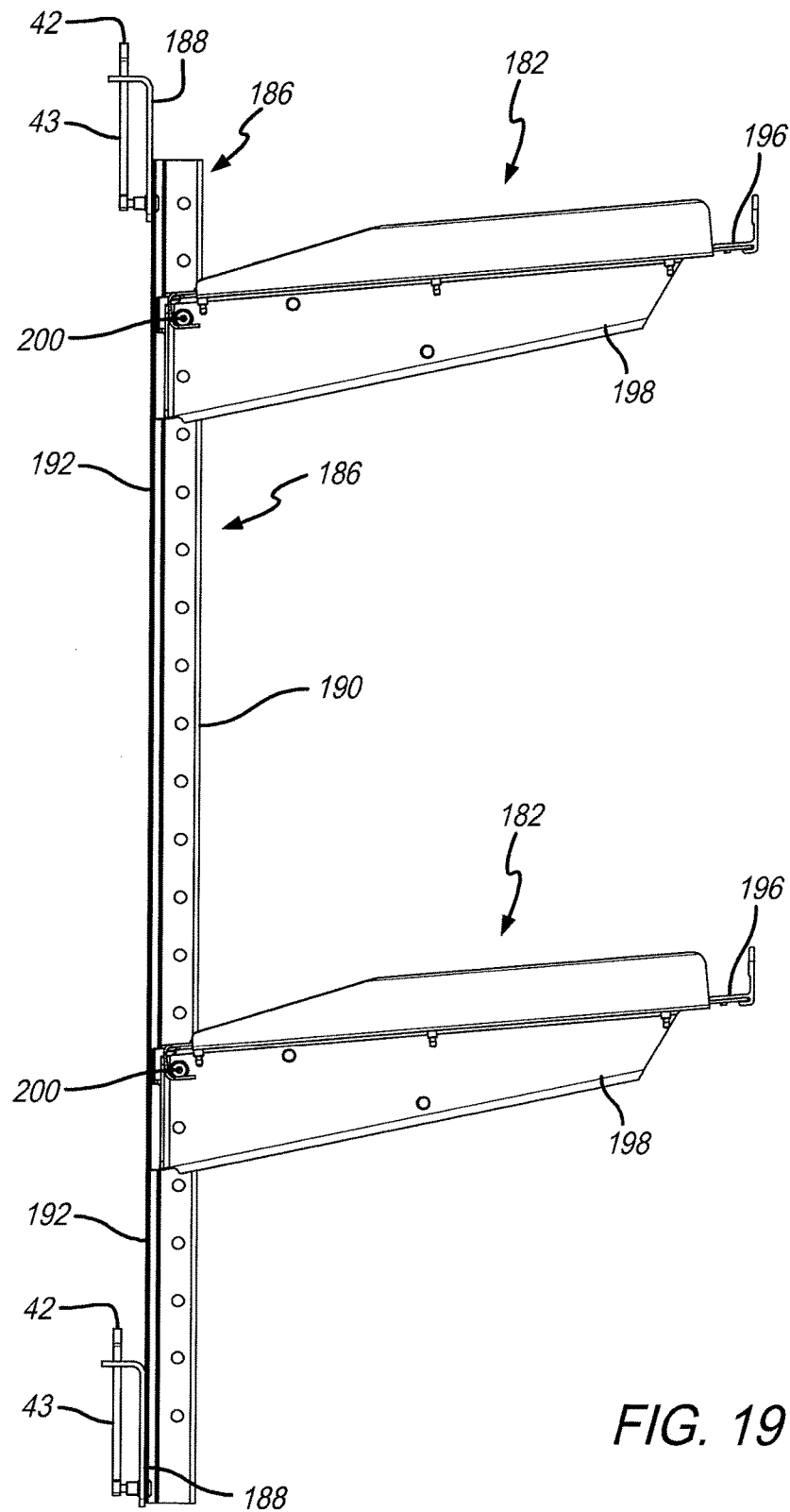
FIG. 19 is an isolated side view of the retention system of FIGS. 18A, 18B.

An isolated side view of retention system 180 is shown in FIG. 19. As depicted, shelve assemblies 182 illustratively include a shelf panel 196 supported by a gusset 198. A pivot pin or bolt 200 is disposed through gusset 198 (or other structure on shelve assembly 182) and extends through hole 194. As further depicted in this view, and as will be appreciated by the skilled artisan reading this disclosure, shelve assembly 182 may be raised or lowered anywhere along the longitudinal extent of T-stud bracket 186 where a hole 194 extends through outwardly extending member 190. It is also appreciated from this illustrative embodiment, that gusset 198 may selectively abut against flanges 192 extending perpendicular from outwardly extending member 190. This view also show how pin 42 extends through hanger 188. In the illustrated embodiment, hanger 188 may be "C" shaped so tines 43 extend through same in two places which offers securement onto tracks 14 or 16. With respect to fastener 200 that it is contemplated that a tool such as a wrench, for example, may be required to remove shelve assembly 182 from T-stud bracket 186.

Figure 20:
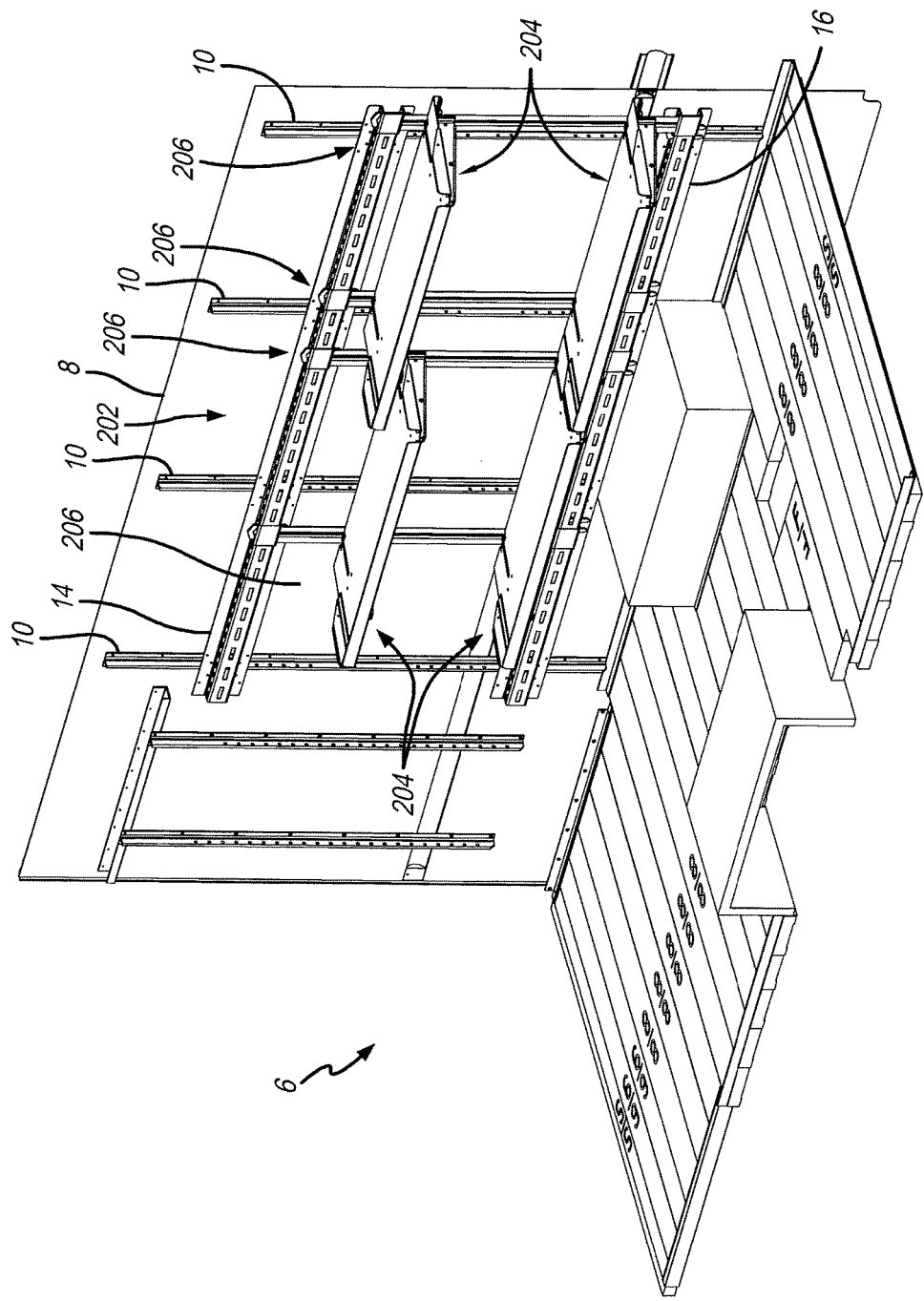
FIG. 20 is a perspective of another illustrative embodiment of a retention system.

Another illustrative embodiment of the present disclosure includes a retention system 202 which is shown attached to side wall 8 of cargo area 6 of utility vehicle 2 of FIG. 20. Retention system 202 is a shelving system similar to the shelving system shown as part of retention system 180 except that in the present embodiment shelve assemblies 204 are coupled to and are pivotable with respect to shelf brackets 206 without requiring any tools in order to remove and replace shelve assemblies 204 thereon. Otherwise, the modularity and functionality of the two retention systems 180 and 202 are substantially similar.

Figure 21:
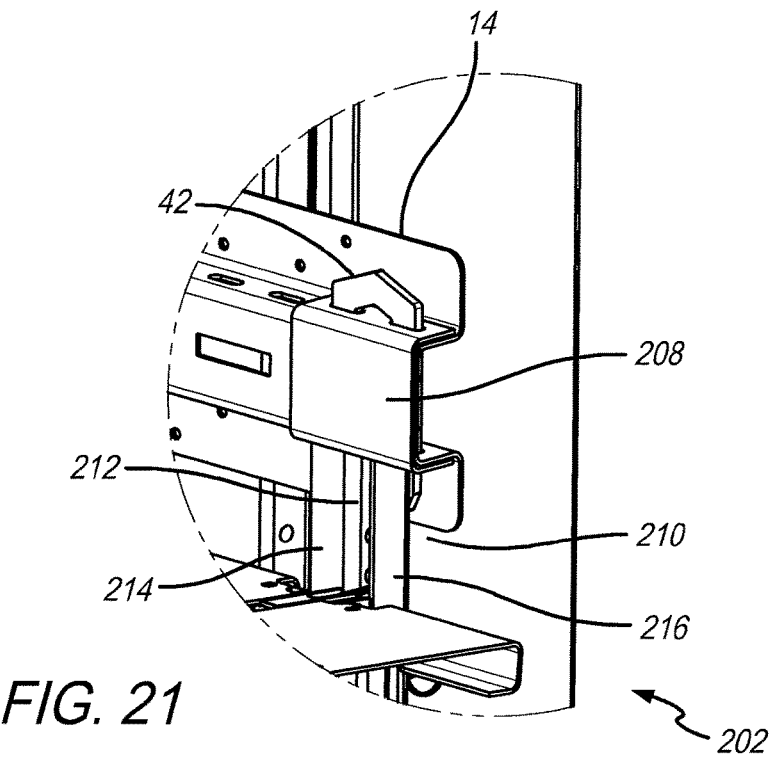
FIG. 21 is a detailed perspective view of the retention system of FIG. 20.

The detailed perspective view of FIG. 21 shows retention system 202 including shelf bracket 206 coupled to hanger 208 which is removably attached to track 14. A particular distinction between retention systems 180 and 202 is shelf bracket 206. In contrast to the shelf bracket assembly 184 of retention system 180, shelf bracket 206 includes an inverted T-stud bracket member 210. Such inverted T-stud bracket member 210 includes a channel 212 that opens to two flange members 214 and 216. Hanger 208 attached to inverted T-stud bracket 210 operates similar to that described with respect to hanger 188 including receiving pin 42 disposed through hanger 208, into track 14 (or 16) so shelf bracket 206 secures to tracks 14 or 16. It is appreciated that hanger 208 may be located at both the top and bottom of inverted T-stud bracket member 210 so shelf brackets 206 may be secured to both tracks 14 and 16 at the same time.

Figure 22:
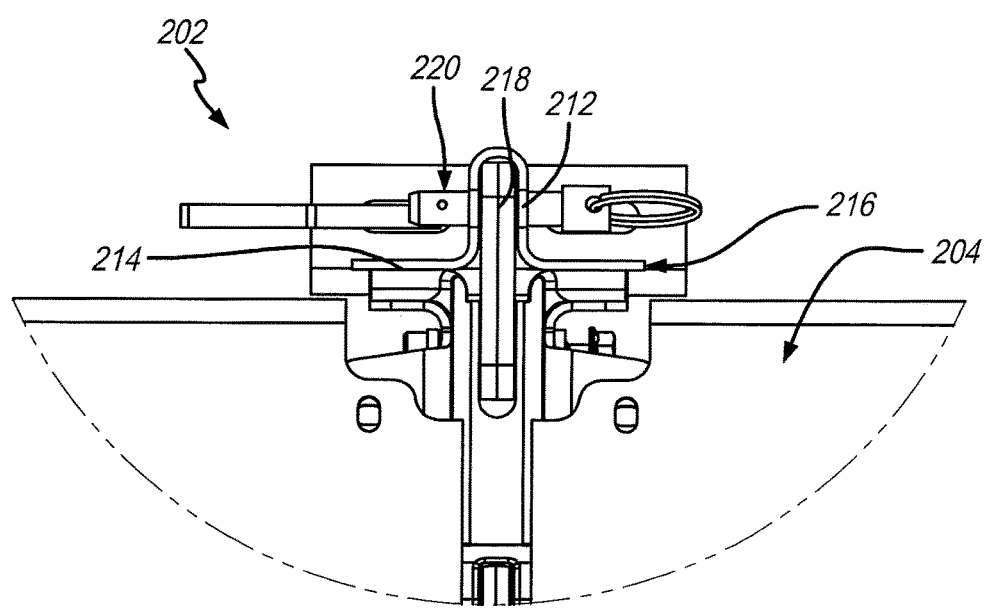
FIG. 22 is a top cross-sectional view of a shelf assembly portion coupled to a shelf bracket of the retention system of FIGS. 20 and 21.
Figure 23:
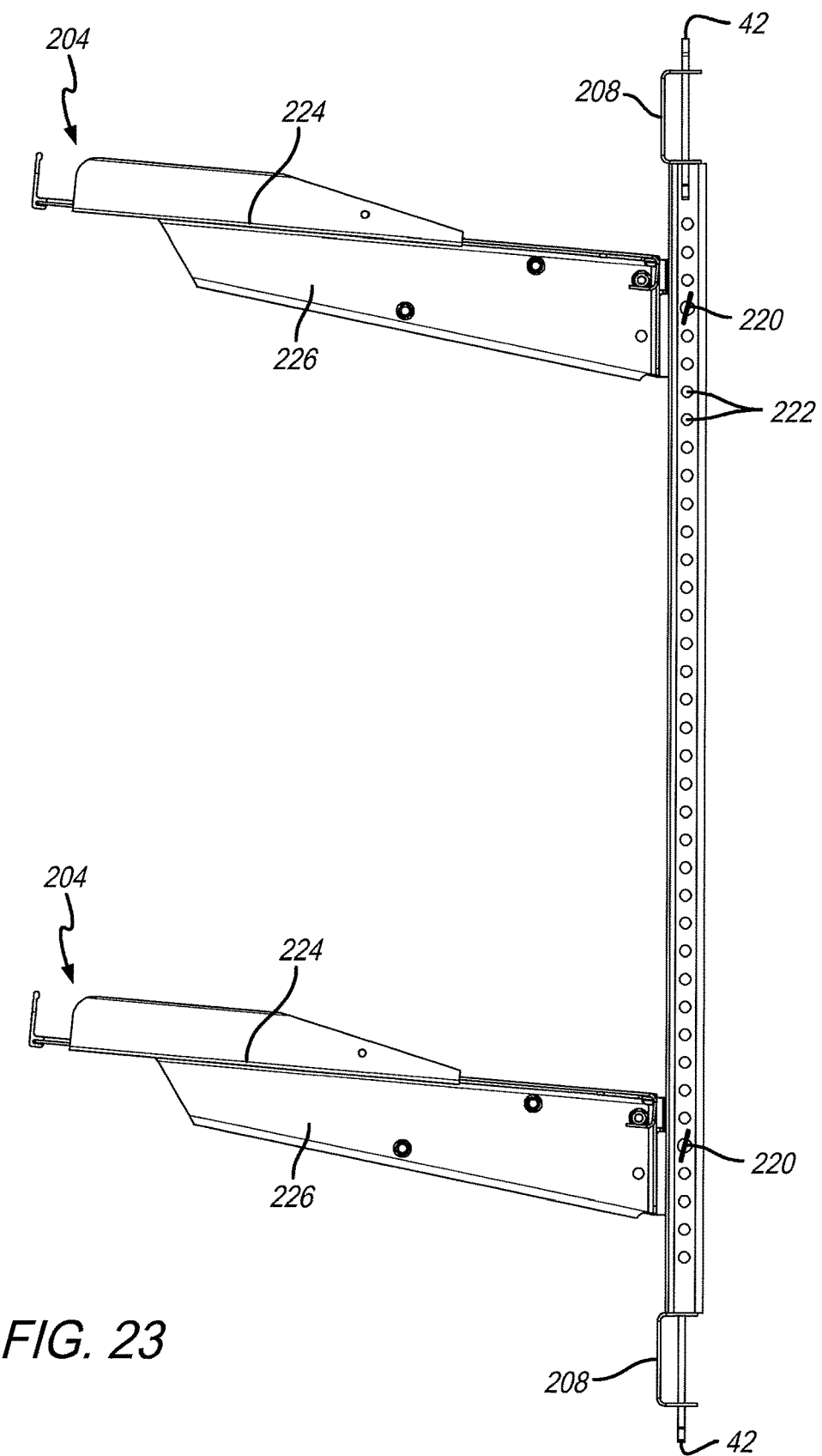
FIG. 23 is a side view of the retention system of FIGS. 20 through 22.

A top cross-sectional view of shelf assembly 204 coupled to shelf bracket 206 is shown in FIG. 22. This view demonstrates how shelf assembly 204 can be removed without tools. Illustratively, an attachment bracket 218 extends from the rear of shelf assembly 204 and configured to fit into channel 212 of inverted T-stud bracket member 210 as illustratively shown herein. A cotter pin 220 or other like pin may be disposed through holes 222 (see FIG. 23) of inverted T-stud bracket member 210 and a hole (not shown) in attachment bracket 218 to secure shelf assembly 204 to shelf bracket 206. By extending the cotter pin 220 through both a portion of the shelf assembly 204 and shelf bracket 206, shelf assembly 204 is secured to sidewall 8. It is appreciated from the side view shown in FIG. 23 how the plurality of the holes 222 are regularly positioned along the longitudinal extent of inverted T-stud bracket member 210 which allows assembly 204 to be positioned about anywhere along the longitudinal extent of shelf bracket 206. With respect to shelf assembly 204, it includes a shelf panel 224 and gusset 226 is shown (and as similar to the prior embodiment).

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure.

The invention claimed is:

1. A utility land vehicle having a driver compartment and a cargo compartment including a cargo compartment wall, the utility land vehicle cargo compartment comprising:
    a first longitudinally extending track;
    a second longitudinally extending track;
    wherein each of the first and second longitudinally extending tracks include a plurality of track holes each regularly positioned along a longitudinal extent of each of the first and second longitudinally extending tracks;
    wherein the first and second longitudinally extending tracks are placed on the cargo compartment wall and spaced apart from each other;
    a latch assembly comprising a first latch and a second latch;
    wherein each of the first and second latches include at least a latch member and a latch trigger;
    wherein the latch member is movable to selectively hold and release a bar;
    wherein the latch trigger selectively moves the latch member when the latch trigger is actuated;
    wherein the first latch is removably attached to the first track and the second latch is removably attached to the second track which causes the first and second latches to be spaced apart from each other;
    a tie attached to each latch trigger of the first and second latches, wherein actuation of the tie causes both latch triggers to move the respective latch member of each of the first and second latches to a release position;
    a receiver assembly comprising first and second receivers;
    wherein each of the first and second receivers includes a body and a slot formed in the body;
    wherein the body of the first receiver includes a portion that is removably attached to the first track and the body of the second receiver includes a portion that is removably attached to the second track;
    wherein each of the slots formed in each body of each of the first and second receivers includes an opening wherein the opening of the slot formed in the body of the first receiver faces the first latch, and the opening of the slot formed in the body of the second receiver faces the second latch; and
    wherein the bar is configured to enter the slot through the opening of at least one of the first and second receivers.

2. The utility land vehicle of claim 1, further comprising at least one bar assembly configured to attach to a storage structure to be located in the cargo compartment of the vehicle, wherein the bar assembly includes the bar which is configured and sized to fit into one of the first latch, second latch, first receiver, or second receiver.

3. The utility land vehicle of claim 1, further comprising first and second bar assemblies each configured to attach to a storage structure to be located in the cargo compartment of the utility land vehicle, wherein both the first and second bar assemblies include the bar, wherein the bar of the first bar assembly is configured and sized to fit into, be secured by, and selectively released from the first latch, and the bar of the second bar assembly is configured and sized to fit into the slot of the first receiver through the opening of the first receiver, wherein the latch member of the first latch holds the bar of the first bar assembly until actuation of the tie selectively releases the bar of the first bar assembly from the latch member, and thereafter the bar of the second bar assembly is free to move out of the slot of the first receiver through the opening of the first receiver.

4. The utility land vehicle of claim 3, further comprising third and fourth bar assemblies each configured to attach to a storage structure to be located in the cargo compartment of the utility land vehicle, wherein both the third and fourth bar assemblies include the bar, wherein the bar of the third bar assembly is configured and sized to fit into, be secured by, and selectively released from the second latch, and the bar of the fourth bar assembly is configured and sized to fit into the slot of the second receiver through the opening of the second receiver, wherein the latch member of the second latch holds the bar of the third bar assembly until actuation of the tie selectively releases the bar of the third bar assembly from the latch member, and thereafter the bar of the fourth bar assembly is free to move out of the slot of the second receiver through the opening of the second receiver.

5. The utility land vehicle of claim 1, further comprising a plurality of pins wherein a respective one of said pins engages each one of the first and second latches and each one of the first and second receivers, wherein each pin is disposed through at least one of the plurality of track holes on the first or the second longitudinally extending tracks.

6. The utility land vehicle of claim 5, wherein each of the plurality of pins includes first and second spaced apart tines such that each of the tines extend through a first and second corresponding track hole of the plurality of track holes.

7. The utility land vehicle of claim 1, wherein the tie is composed of a material selected from the group consisting of a flexible material and a rigid material.

8. The utility land vehicle of claim 1, wherein the tie is selected from the group consisting of a cable and a bar.

9. The utility land vehicle of claim 1, wherein the first and second longitudinally extending tracks are positioned parallel to each other.

10. The utility land vehicle of claim 1, wherein a storage structure to be located in the cargo compartment of the utility land vehicle is selected from the group consisting of a cart, container, rack, cabinet, and shelf.

11. The utility land vehicle of claim 1, wherein the bar is selected from the group consisting of a rod, arm, appendage, bracket, and hook.

12. A utility land vehicle having a driver compartment and a cargo compartment including a cargo compartment wall, the utility land vehicle cargo compartment comprising:
    a latch assembly comprising a first latch and a second latch;
    wherein each of the first and second latches include at least a latch member and a latch trigger;
    wherein the latch member is movable to selectively hold and release a storage structure;
    wherein the latch trigger selectively moves the latch member when the latch trigger is actuated;
    wherein the first latch and the second latch are spaced apart from each other;
    a tie attached to each latch trigger of the first and second latches, wherein actuation of the tie causes both latch triggers to move the respective latch member of each of the first and second latches to a release position; and
    a receiver assembly comprising first and second receivers;
    wherein each of the first and second receivers includes a body and a slot formed in the body;
    wherein each of the slots formed in each body of each of the first and second receivers includes an opening wherein the opening of the slot formed in the body of the first receiver faces the first latch, and the opening of the slot formed in the body of the second receiver faces the second latch; and
    wherein the storage structure is configured to enter the slot through the opening of at least one of the first and second receivers.

13. The utility land vehicle of claim 12, further comprising a first longitudinally extending track, and a second longitudinally extending track, wherein each of the first and second longitudinally extending tracks include a plurality of track holes each regularly positioned along a longitudinal extent of each of the first and second longitudinally extending tracks, and wherein the first and second longitudinally extending tracks are placed on the cargo compartment wall and spaced apart from each other.

14. The utility land vehicle of claim 13, wherein the first latch is removably attached to the first track and the second latch is removably attached to the second track.

15. The utility land vehicle of claim 13, wherein the body of the first receiver includes a portion that is removably attached to the first track and the body of the second receiver includes a portion that is removably attached to the second track.

16. The utility land vehicle of claim 12, wherein the storage structure to be located in the cargo compartment of the utility land vehicle is selected from the group consisting of a cart, container, rack, cabinet, and shelf.

* * * * *